United States Patent
Abe

(10) Patent No.: US 9,361,133 B2
(45) Date of Patent: Jun. 7, 2016

(54) MANAGEMENT SCREEN FOR IMAGE PROCESSING APPARATUS AND METHOD THEREOF

(75) Inventor: Koichi Abe, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 337 days.

(21) Appl. No.: 12/940,910

(22) Filed: Nov. 5, 2010

(65) Prior Publication Data

US 2011/0119606 A1    May 19, 2011

(30) Foreign Application Priority Data

Nov. 17, 2009   (JP) .................................. 2009-262073

(51) Int. Cl.
*G06F 3/048* (2013.01)
*G06F 9/44* (2006.01)
*G06F 3/12* (2006.01)

(52) U.S. Cl.
CPC ............ *G06F 9/4448* (2013.01); *G06F 3/1203* (2013.01); *G06F 3/1205* (2013.01); *G06F 3/1225* (2013.01); *G06F 3/1285* (2013.01)

(58) Field of Classification Search
None
See application file for complete search history.

(56) References Cited

U.S. PATENT DOCUMENTS

| | | | | |
|---|---|---|---|---|
| 2002/0097436 A1* | 7/2002 | Yokoyama | ............. | H04N 1/644 358/2.1 |
| 2007/0002355 A1* | 1/2007 | Kai | .............................. | 358/1.13 |
| 2007/0245346 A1* | 10/2007 | Shintoku | ............... | G06F 9/4448 717/174 |
| 2007/0276652 A1* | 11/2007 | Oki | ........................ | G06F 17/212 704/9 |
| 2009/0290185 A1* | 11/2009 | Shiohara | ............... | G06F 3/1208 358/1.13 |
| 2010/0225959 A1* | 9/2010 | Selvaraj et al. | ............... | 358/1.15 |

FOREIGN PATENT DOCUMENTS

| | | |
|---|---|---|
| JP | 2005-85132 A | 3/2005 |
| JP | 2007-286824 A | 11/2007 |
| JP | 2008-047069 A | 2/2008 |

* cited by examiner

*Primary Examiner* — Hien Duong

(74) *Attorney, Agent, or Firm* — Carter, DeLuca, Farrell & Schmidt, LLP

(57) ABSTRACT

An information processing apparatus configured to display a management screen, used for managing a connected peripheral device, based on control information described with respect to a function that can be instruct d from the management screen includes a storing unit, and a registration unit. The registration unit may register in the storing unit a type of language displayed on a screen provided by software that runs on the information processing apparatus. A display about the software is performed on the management screen based on the type of language registered by the registration unit and the control information.

6 Claims, 17 Drawing Sheets

↔ ADDRESS/DATA BUS

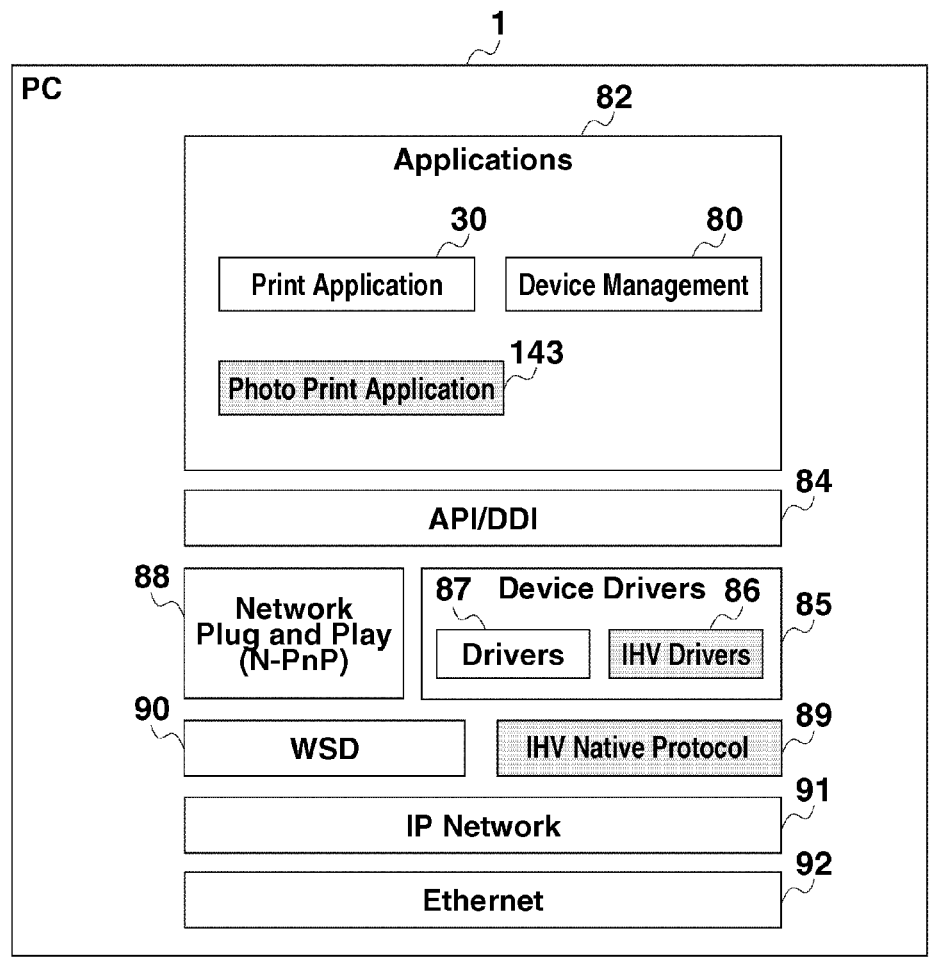

FIG.8   800

```xml
<?xml version="1.0" encoding="utf-8"?>
<dm:deviceManagement xmlns:dm="http://abc.xxx/dm/control">
    <dm:manufacturer>ABC</dm:manufacturer>  ~801
    <dm:model>Kmmn</dm:model>  ~802
    <dm:functions>  ~803
        <dm:function id="1">  ~804
            <dm:name xml:lang="en-US">Printing Preferences</dm:name>  ~805
            <dm:description xml:lang="en-US">Display the printing preferences window.</dm:description>  ~806
            <dm:icon>preferences.ico</dm:icon>  ~807
            <dm:required>  ~808
                <dm:keywordInRegistry key="HKLM¥SOFTWARE¥ABC¥Printer Driver" name="Language">
                    English</dm:keywordInRegistry>  ~809
            </dm:required>
            <dm:execute>printingPreferences "ABC Kmmn"</dm:execute>  ~810
        </dm:function>
        <dm:function id="2">  ~811
            <dm:name xml:lang="ja-JP">Insatsu Settei</dm:name>  ~812
            <dm:description xml:lang="ja-JP">Insatu settei gamen o hyouji suru.</dm:description>  ~813
            <dm:icon>preferences.ico</dm:icon>  ~814
            <dm:required>  ~815
                <dm:keywordInRegistry key="HKLM¥SOFTWARE¥ABC¥Printer Driver" name="Language">
                    Japanese</dm:keywordInRegistry>  ~816
            </dm:required>
            <dm:execute>printingPreferences "ABC Kmmn"</dm:execute>  ~817
        </dm:function>
        <dm:function id="3">  ~818
            <dm:name xml:lang="en-US">Photo Print</dm:name>  ~819
            <dm:description xml:lang="en-US">Print photographs or albums, and so on.</dm:description>  ~820
            <dm:icon>photo.ico</dm:icon>  ~821
            <dm:required>  ~822
                <dm:keywordInRegistry key="HKLM¥SOFTWARE¥ABC¥Printer Driver" name="Language">
                    English</dm:keywordInRegistry>  ~823
                <dm:keywordInRegistry key="HKLM¥SOFTWARE¥ABC¥Photo Print" name="Language">
                    English</dm:keywordInRegistry>  ~824
            </dm:required>
            <dm:execute>PhotoPrint.exe "ABC Kmmn"</dm:execute>  ~825
        </dm:function>
        <dm:function id="4">  ~826
            <dm:name xml:lang="en-US">Photo Print</dm:name>  ~827
            <dm:description xml:lang="en-US">Print photographs or albums, and so on. This application is
                displayed in Japanese.</dm:description>  ~828
            <dm:icon>photo_warning.ico</dm:icon>  ~829
            <dm:required>  ~830
                <dm:keywordInRegistry key="HKLM¥SOFTWARE¥ABC¥Printer Driver" name="Language">
                    English</dm:keywordInRegistry>  ~831
                <dm:keywordInRegistry key="HKLM¥SOFTWARE¥ABC¥Photo Print" name="Language">
                    Japanese</dm:keywordInRegistry>  ~832
            </dm:required>
            <dm:execute>PhotoPrint.exe "ABC Kmmn"</dm:execute>  ~833
        </dm:function>
```

FIG.9

```
        <dm:function id="5">~834
            <dm:name xml:lang="ja-JP">Shashin no Insatu</dm:name>~835
            <dm:description xml:lang="ja-JP">Shashin ya arubamu nadono insatsu o suru. Kono apurikeishon
                    wa eigo de hyouji saremasu.</dm:description>~836
            <dm:icon>photo_warning.ico</dm:icon>~837
            <dm:required>~838
                <dm:keywordInRegistry key="HKLM¥SOFTWARE¥ABC¥Printer Driver" name="Language">
                    Japanese</dm:keywordInRegistry>~839
                <dm:keywordInRegistry key="HKLM¥SOFTWARE¥ABC¥Photo Print" name="Language">
                    English</dm:keywordInRegistry>~840
            </dm:required>
            <dm:execute>PhotoPrint.exe "ABC Kmmn"</dm:execute>~841
        </dm:function>
        <dm:function id="6">~842
            <dm:name xml:lang="ja-JP">Shashin no Insatu</dm:name>~843
            <dm:description xml:lang="ja-JP">Shashin ya arubamu nadono insatsu o suru.</dm:description>~844
            <dm:icon>photo.ico</dm:icon>~845
            <dm:required>~846
                <dm:keywordInRegistry key="HKLM¥SOFTWARE¥ABC¥Printer Driver" name="Language">
                    Japanese</dm:keywordInRegistry>~847
                <dm:keywordInRegistry key="HKLM¥SOFTWARE¥ABC¥Photo Print" name="Language">
                    Japanese</dm:keywordInRegistry>~848
            </dm:required>
            <dm:execute>PhotoPrint.exe "ABC Kmmn"</dm:execute>~849
        </dm:function>
    </dm:functions>
</dm:deviceManagement>
```

800

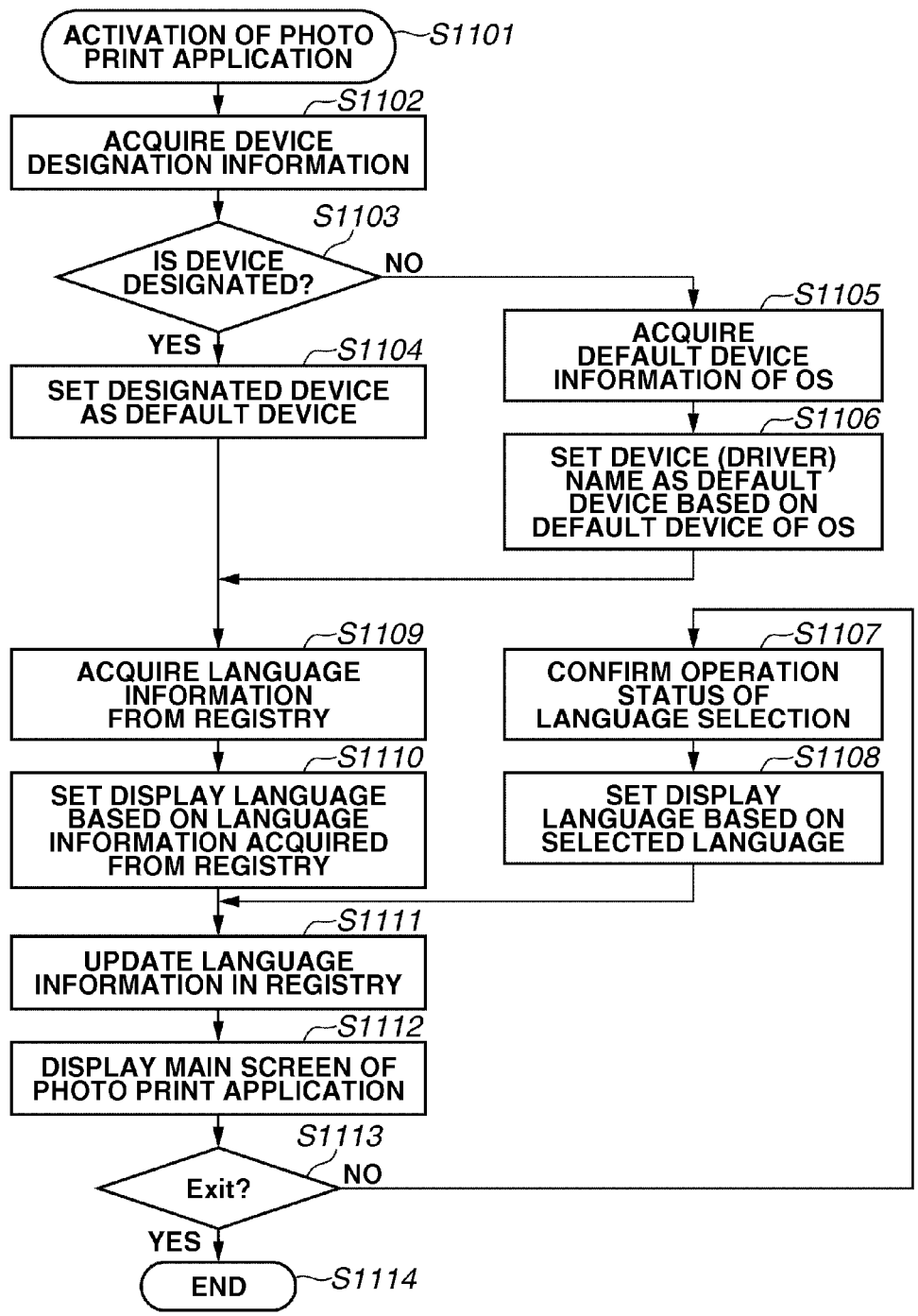

MANAGEMENT SCREEN FOR IMAGE PROCESSING APPARATUS AND METHOD THEREOF

BACKGROUND OF THE INVENTION

1. Field of the Invention

The present invention relates to a system including an information processing apparatus and a peripheral device such as a printer. More specifically, the present invention relates to a technique that provides a method for controlling the peripheral device from the information processing apparatus in the system.

2. Description of the Related Art

Recently, a system in which a peripheral device is connected to an information processing system using various interfaces, e.g., a universal serial bus (USB), Ethernet, and wireless local area network (LAN), is effectively used in various environments such as the home and the office. Examples of the peripheral device are a printer, a copying machine, a facsimile, a scanner, a digital camera, and an apparatus that integrally includes functions of such devices.

A new function for managing the peripheral device connected to the information processing apparatus such as a personal computer (PC) is included in Windows® 7. More specifically, Windows® 7 includes Device Stage® having a function for linking a Devices and printers folder, i.e., a window for displaying the devices connected to the PC, to an application or service unique to each peripheral device. The Devices and printers folder screen can be displayed from a start menu of Windows®. A Device Stage® screen of each peripheral device can then be opened from the Device and Printers folder. The Device Stage® can provide a visual screen, and a user can easily access a function or a service related to the device from the screen.

For example, a link to an application capable of performing photo printing may be provided from a task (i.e., a button) in the Device Stage® screen. In such a case, the application capable of performing photo printing is activated from the Device Stage® screen, and the photo printing is performed using the peripheral device (e.g., a multifunction peripheral (MFP)). Further, the link for opening a print setting screen of a printer driver or a read setting screen of a scanner driver may be provided from the Device Stage® screen. Furthermore, the user can easily access a site related to the peripheral device by including in the Device Stage® screen the link to a support site on the Internet provided by a manufacturer. Hereinafter, a screen such as the Device Stage® screen for managing the peripheral device will be referred to as a device management screen.

A display language of Windows® 7 Operating System (hereinafter referred to as OS) is different depending on a sales area of the OS. For example, if the sales area is Japan, the display language of the OS is generally Japanese, and if the sales area is the United States, the display language is generally English. Further, in the case of an OS environment of Windows® 7 Ultimate, which is the top stock-keeping unit (SKP) of Windows® 7, the languages to be used can be increased by installing a Language Pack distributed by Windows® Update via the Internet. For example, if the user installs a Japanese Language Pack in an English OS, the user can use the OS by switching between two languages, i.e., English and Japanese. The user can switch between the languages by performing an operation described below.

(1) Open "control panel" from a start menu
(2) Click "change display language"
(3) Select the display language However, since it is less likely for Windows® 7 Ultimate to be used compared to other SKUs, most of the users using Windows® 7 cannot use the Language Pack. Such users thus use the OS of the language used in the area of residence.

Windows® 7 Device Stage® is displayed using the same language as the display language of the OS. For example, if the Device Stage® screen is activated on the Japanese OS, the language of character strings attached to buttons indicating each task in the Device Stage® screen is displayed in Japanese. On the other hand, if the Device Stage® screen is activated on the English OS, the language of the character strings attached to the buttons indicating each task in the Device Stage® screen is displayed in English. Similar results are acquired when the user installs the Language Pack. For example, if the user installs a Spanish Language Pack on the English OS and the user selects Spanish as the display language of the OS, the language of the character strings attached to the buttons indicating each task in the Device Stage® screen is displayed in Spanish.

Further, each of vendors (i.e., independent hardware vendor (IHV) or independent software vendor (ISV)) distributes drivers for controlling the peripheral devices and the applications used in the peripheral devices. The vendors generally distribute the drivers and the applications via the Internet. Many of the drivers and the applications accommodate multiple languages, and the user can switch the display language via a user interface of the driver or the application. The user can thus easily use the driver or the application using the native language of the user, unlike the above-described case of the OS. For example, the user living outside the home country may use the OS using the language used in the area of residence, and the driver or application using the mother language of the user as the display language. In other words, the user uses the driver or the application in the language other than the language used in the area of residence. Japanese Patent Application Laid-Open No. 2005-85132 also discusses such a conventional example using another technique.

It is assumed as described above that a user living outside the home country may use the OS using the language of the area of residence and the driver or application using the mother language as the display language. The user thus uses the driver or the application in the language other than the language used in the area of residence. The user may then open the print setting screen of the printer driver, the read setting screen of the scanner driver, or activate a photo print application from the task (i.e., a button) in the device management screen. In such a case, if the language used in the area of residence is English and the mother language of the user is Japanese, the character string attached to each task (button) in the device management screen are displayed in English.

However, the print setting screen of the printer driver, the read setting screen of the scanner driver, and the screen of the photo print application displayed when each task is executed are displayed in Japanese. The user may thus become confused, and user-friendliness becomes low.

Further, there may be a case where the print setting screen of the printer driver is displayed in Japanese, and the photo print application does not accommodate Japanese or English and is thus displayed in Spanish. In such a case, the character string attached to each task (button) in the device management screen is displayed in English. However, if the task for displaying the print setting screen of the printer driver is executed, the print setting screen is displayed in Japanese. Further, if the task for activating the photo print application is executed, the application is activated and displayed in Spanish. The user may thus become confused, so that the user-friendliness becomes low.

SUMMARY OF THE INVENTION

The present invention is directed to providing an appropriate display or function according to a usage environment of the user.

According to an aspect of the present invention, an information processing apparatus configured to display a management screen, used for managing a connected peripheral device, based on control information described with respect to a function that can be instructed from the management screen includes a storing unit, and a registration unit. The registration unit may register in the storing unit a type of language displayed on a screen provided by software that runs on the information processing apparatus. A display about the software is performed on the management screen based on the type of language registered by the registration unit and the control information.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of a software configuration of the PC.

FIG. 8 illustrates a content of a device management control file.

FIG. 9 illustrates a content of the device management control file.

FIG. 16 is a flowchart illustrating an example of a process for activating the photo print application.

DESCRIPTION OF THE EMBODIMENTS

Various exemplary embodiments, features, and aspects of the invention will be described in detail below with reference to the drawings.

Hereinafter, information about Windows® 7 OS to which no detailed description is added is information disclosed in reference site 1 described below as of Nov. 5, 2009, so that detailed description will be omitted.

Reference site 1: http://msdn.microsoft.com/en-us/library/default.aspx

Further, information about the USB is disclosed in reference site 2 described below as of Nov. 5, 2009, so that detailed description will be omitted.

Reference site 2: http://www.usb.org/home

Furthermore, information about Web Service on Devices (WSD) is information disclosed in reference site 3 described below as of Nov. 5, 2009, so that detailed description will be omitted.

Reference site 3: http://www.microsoft.co,/shdc/connect/rally/rallywsd.mspx

Figure 1:
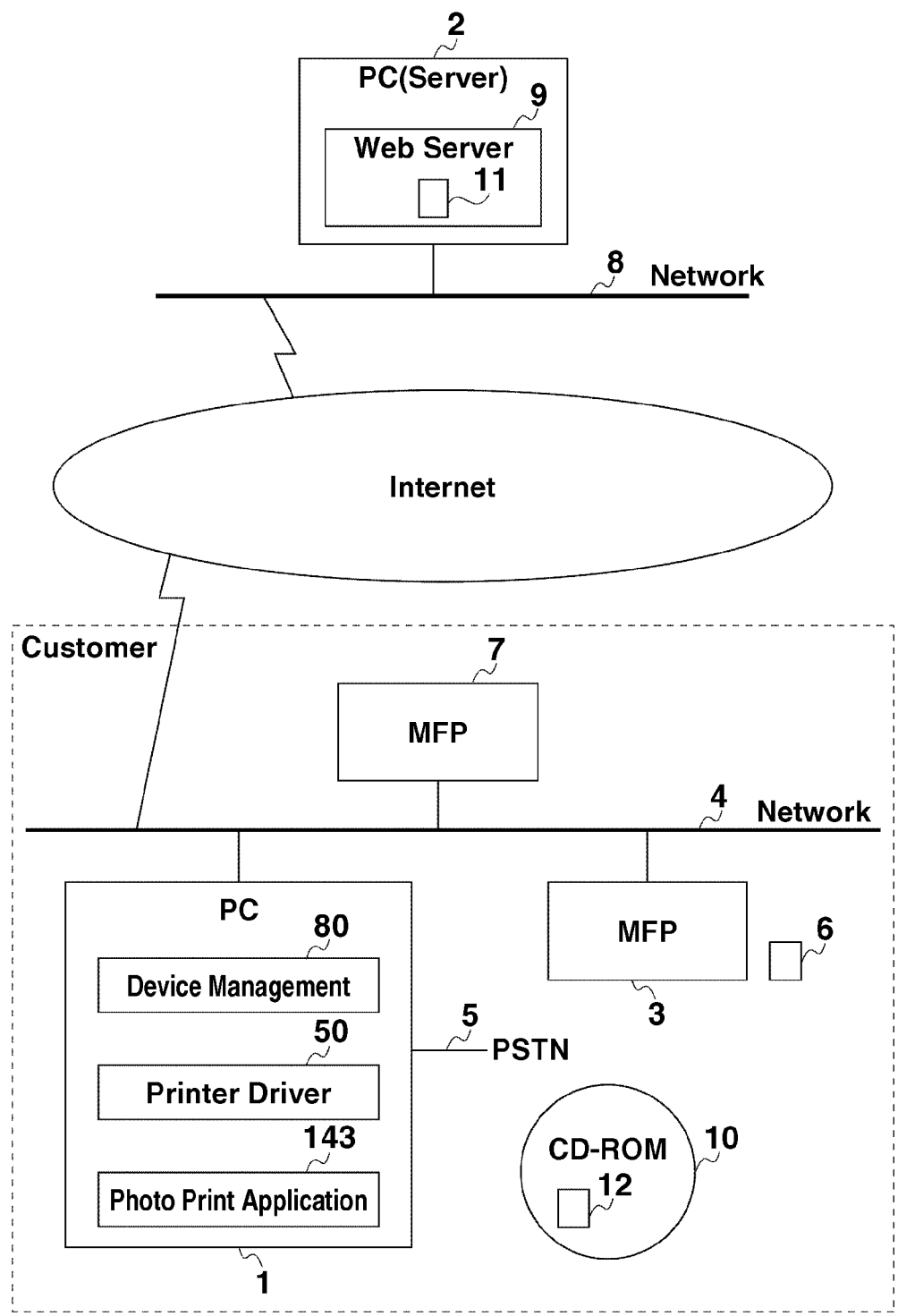
FIG. 1 illustrates an example of a system configuration of a control system including an information processing apparatus and a peripheral device.

FIG. 1 illustrates an example of a system configuration of a control system including an information processing apparatus and a peripheral device. Referring to FIG. 1, information processing apparatuses 1 and 2 are general PCs (to be referred to as PC 1 and PC 2). The PC 1 and the PC 2 are configured of hardware as will be described below with reference to FIG. 2A, and an OS equivalent to Windows® 7 OS is installed in each of the PCs. The PC 1 and the PC 2 are connected to networks 4 and 8, respectively, configured of the Ethernet.

An MFP 3, which is an example of a peripheral device, includes a color inkjet printer, a color facsimile, a color scanner, and an external storage for a flash memory. More specifically, the MFP 3 is assumed to be an MFP of a model name Kmmn manufactured by ABC Corporation. The peripheral device may be a printer, a copying machine, a facsimile, a scanner, a digital camera, and a device that integrally includes such functions. The MFP 3 is configured of hardware described below with reference to FIG. 2b. The MFP 3 and the PC 1 are connected via the network 4 and can bi-directionally communicate with each other.

An application (i.e., a device management application) 80 is configured of a file of an executable format for Windows® (i.e., *.EXE). The device management application which is an example of the application 80 includes a function for displaying the device management screen illustrated in FIG. 5B to be described below. A printer driver 50 will be described below with reference to FIG. 4. A photo print application 143 will be described below with reference to FIG. 7. The network 4 is a general home network for a home user created inside the home of the user (customer) using the MFP 3. The MFP 3 is connected to the PC 1 via the network 4 within the home and is shared between family members. The network 8 is an office network created inside the ABC corporation.

The PC 2 connected to the network 8 includes a web server 9 having a web server function and provides a web site of the ABC corporation via the Internet. A compact disc read-only memory (CD-ROM) 10 can be inserted to the PC 1 to store software (program) and electronic files. The software may be a software program, computer software, software system, or a software package containing a written program, procedure, and/or rules to direct or perform an operation of a computer. The software may run on an apparatus in that the apparatus, such as a central processing unit of the apparatus, may process instructions in a program. The software may include a driver that controls an interface between a computer and a peripheral device such as by determining how the computer will communicate with the peripheral device. Pressing a button may activate software. A device management control file 800 to be described below with reference to FIGS. 8 and 9 is stored in file storage units 11 and 12 in the Web server 9 or the CD-ROM 10 and is distributed from the file storing units 11 and 12. An analog telephone line 5 is used by the PC 1 in transmitting and receiving the facsimile. The PC 1 can refer to a flash memory 6 as storage by loading the flash memory 6 to a flash memory loading slot (not illustrated). An MFP 7 is assumed to be of a model Defg manufactured by XYZ Corporation and is a different device from the MFP 3.

Figure 2A:
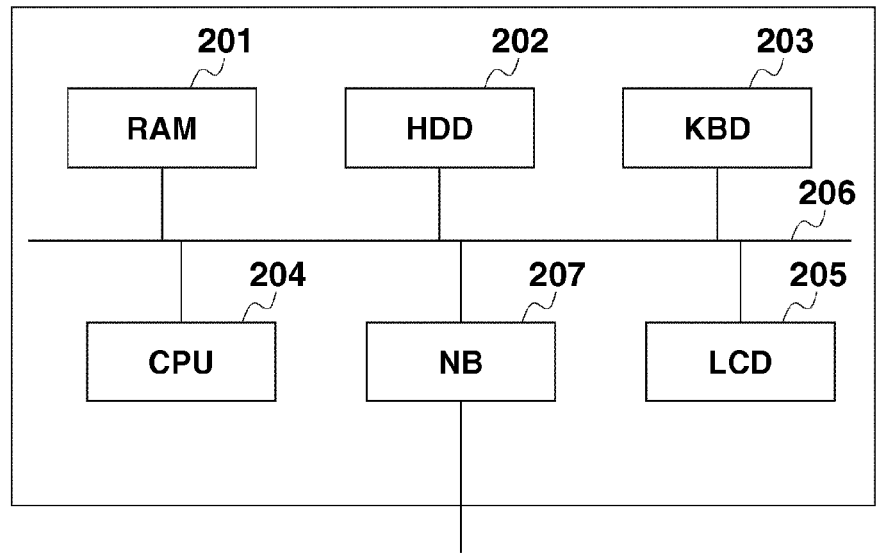
FIGS. 2A and 2B illustrate examples of hardware configurations of a PC and an MFP, respectively.
Figure 2B:
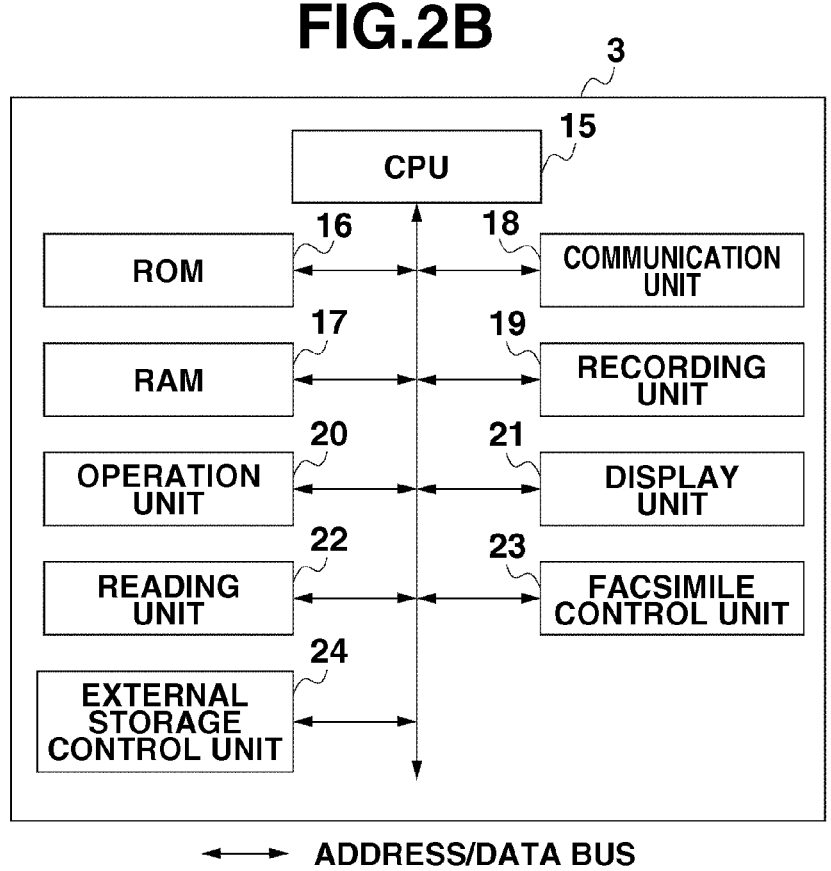

FIGS. 2A and 2B each illustrate examples of hardware configurations of the PC and the MFP, respectively. The PC 1 and the PC 2 are configured by hardware as illustrated in FIG. 2A. The PC 1 will be described below as an example with reference to FIG. 2A. Referring to FIG. 2A, the PC 1 includes a random access memory (RAM) 201, a hard disk drive (HDD) 202, a keyboard (KBD) 203, and a CPU 204. Further, the PC 1 includes a display (liquid crystal display (LCD)) 205 and a network board (NB) 207. Furthermore, the PC 1 includes a bus 206 that connects the above-described components with each other.

The HDD 202 is an example of the storing unit, the KBD 203 is an example of an input unit, the CPU 204 is an example of a control unit, the LCD 205 is an example of a display unit, and the NB 207 is an example of a communication control unit. The storing unit may be a portable CD-ROM or an internally installed ROM. The HDD 202 stores the applications such as the device management application 80 and the photo print application, and each of modules (software) illustrated in FIG. 3, FIG. 4 (including the printer driver 50), and FIG. 10, that are read by the RAM 201 as necessary and executed by the CPU 204. As a result, the CPU 204 realizes the functions of the applications such as the device management application 80 and the photo print application 143, and each of the modules (software) illustrated in FIG. 3, FIG. 4 (including the printer driver 50), and FIG. 10.

FIG. 2B illustrates the hardware configuration of the MFP 3. Referring to FIG. 2B, the CPU 15 is a microprocessor and a central processing device of the MFP 3. The CPU 15 controls a RAM 17, a communication unit 18, a recording unit 19, an operation unit 20, a display unit 21, a reading unit 22, a facsimile control unit 23, and an external storage control unit 24. The CPU 15 controls such components according to a program stored in a ROM 16.

The ROM 16 stores the programs for the MFP 3 to perform a recording process or a process for notifying the PC 1 of a print status, according to control by a printer driver 50 (to be described below with reference to FIG. 4). Further, the ROM 16 stores the programs for the MFP 3 to perform transmission and reception of a facsimile or a process for notifying the PC 1 on a facsimile transmission/reception status, according to control by a facsimile driver (not illustrated). Furthermore, the ROM 16 stores the programs for the MFP 3 to perform a process of reading an image or notifying the PC 1 of a reading status. The MFP 3 performs such a process according to control by a Windows Image Acquisition (WIA) driver (not illustrated) or a Technology without any interested name (TWAIN) driver (not illustrated) driver.

The RAM 17 temporarily stores print data mainly transmitted from the PC 1 to be printed by the recording unit 19. Further, the RAM 17 temporarily stores image data read by the reading unit 22, facsimile transmission data transmitted from the PC 1, and facsimile reception data received by the facsimile control unit.

The communication unit 18 includes connection ports for the network 4 and the analog telephone line 5, and controls the Ethernet and analog communication of the facsimile. The recording unit 19 includes a recording unit configured of an inkjet recording head, color inks, a carriage, and a recording paper conveyance mechanism. The recording unit 19 also includes an electronic circuit including an Application Specific Integrated Circuit (ASIC) for generating a printing pulse in the recording head based on the print data.

When the user performs a printing operation or a facsimile transmission operation on a printable application, the HDD 202 in the PC 1 illustrated in FIG. 2A temporarily stores as an EMF format spool file a display content of the file opened in the application (i.e., image data). The spool file is then converted via the printer driver 50 into the print data including an MFP control command, or via the facsimile driver into the facsimile transmission data including the MFP control command, and transmitted to the MFP 3 via the network 4. The recording unit 19 converts the print data received by the MFP 3 into the printing pulse to be printed on the recording paper. The facsimile control unit 23 converts the facsimile transmission data received by the MFP 3 into a facsimile communication protocol. The facsimile control unit 23 then transmits the converted transmission data to the facsimile apparatus of a transmission destination via the analog telephone line 5.

The user can control the MFP 3 from the operation unit 20, which includes various buttons such as a power button and a reset button. The display unit 21 includes a touch panel LCD and displays the status of the MFP 3, various settings and phone numbers, and input. The reading unit 22, which includes a color image sensor and an electric circuit having an image processing ASIC, controls a scanner function. The facsimile control unit 23, which includes a facsimile modem and an analog communication circuit, controls transmission and reception of the facsimile according to the facsimile communication protocol. The external storage control unit 24, which includes a slot for attaching a flash memory and an interface circuit for the storage, controls the attached flash memory.

FIG. 3 illustrates an example of the software configuration of the PC. Referring to FIG. 3, an Ethernet controls stack 92 controls the Ethernet. An Internet Protocol (IP) network control stack 91 controls the IP network. A WSD control stack 90 controls the WSD. An IHV native protocol control stack 89 controls a unique protocol of the IHV. A network plug and play (N-PnP) control stack 88 controls the network plug and play. Plug and Play Extensions (PnP-X) is an extended function of plug and play included in the Windows® 7 OS as a standard. However, according to the present exemplary embodiment, an example will be described in which the N-PnP is used as an equivalent function of the PnP-X.

A device drivers group 85 includes a standard drivers group 87 that is included in the OS as a standard, and an IHV drivers group 86 supplied by the IHV. An application program interface (API)/Device Driver Interface (DDI) 84 includes an API and a DDI. An application group 82 includes the device management application 80, a print application 30, and the photo print application 143. The device management application 80 is included in the OS as a standard. The print application 30 will be described below with reference to FIG. 4. The photo print application 143 will be described below with reference to FIG. 7. The device management application 80 manages, executes, and displays via the API/DDI 84 *a* devices and printers folder 500 described below with reference to FIG. 5A and a device management screen 600 to be described below with reference to FIG. 5B. Hereinafter, the devices and printers folder 500 will be referred to as the folder 500.

Figure 4:
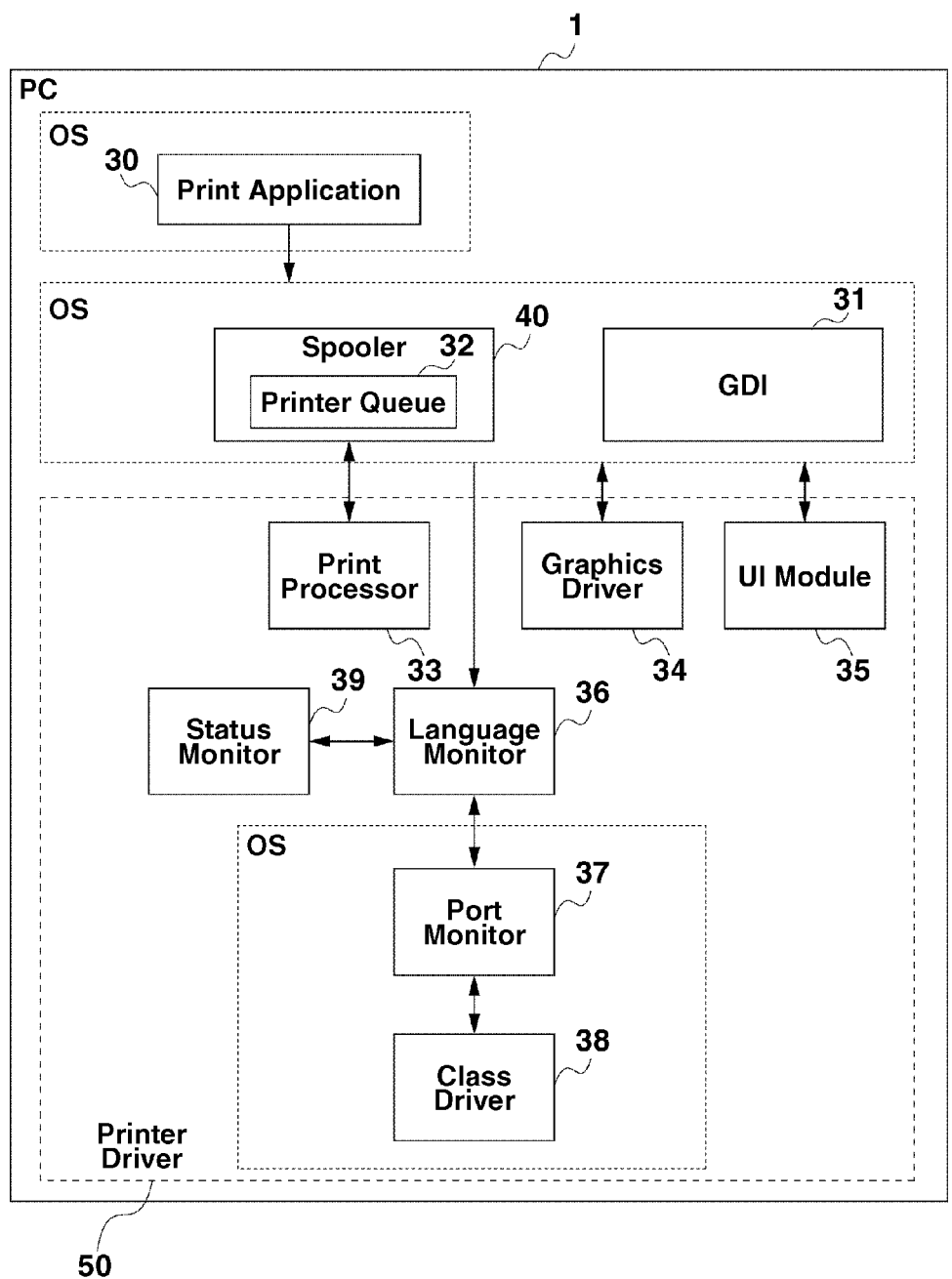
FIG. 4 illustrates an example of a configuration of a printer driver in the PC.

FIG. 4 illustrates an example of a configuration of the printer driver in the PC. Referring to FIG. 4, a printer driver 50 is the printer driver to be used by the MFP 3 and is installed in the PC 1. The printer driver 50 includes a plurality of modules, i.e., a print processor 33, a graphics driver 34, a user interface (UI) module 35, a language monitor 36, and a status monitor 39. The print application 30 corresponds to, for example, Notepad (Notepad.exe), i.e., a text editor included in the OS as a standard. A graphics device interface (GDI) 31 is a part of the OS. A print queue 32 included in a spooler 40 queues a print job.

The print processor 33 changes a print layout or performs special processing on a print image. The graphics driver 34 performs as a core of image processing in the printer driver, image processing for printing based on a drawing instruction transmitted from the GDI 31. The graphics driver 34 thus generates a print control command. The UI module 35 provides a UI of the printer driver and controls the printer driver. The language monitor 36 controls transmission and reception of the data as a data communication I/F. The status monitor 39 displays a remaining amount of ink, warning, and error with respect to the MFP 3.

A port monitor 37 transmits the data received from the language monitor 36 to an appropriate port, or receives the data transmitted from the MFP 3, via a class driver 38. The class driver 38 is a low level module that is closest to the port. According to the present exemplary embodiment, the class driver 38 corresponds to a driver of the WSD printer or the printer of a protocol unique to the IHV, and controls the port (i.e., the network port according to the present exemplary embodiment). The printer driver 50 is manufactured by ABC corporation which manufactures the MFP 3.

Figure 5A:
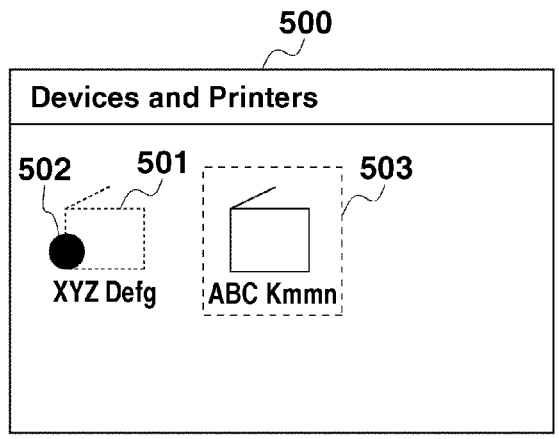
FIGS. 5A and 5B illustrate examples of a Device and Printers folder and a device management screen, respectively.
Figure 5B:
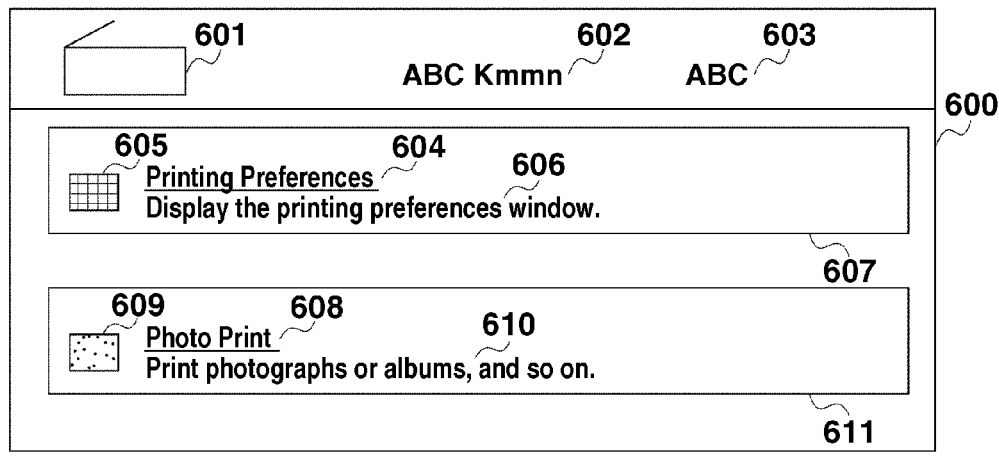

FIGS. 5A and 5B illustrate examples of the devices and printers folder and the device management screen, respectively. Referring to FIG. 5A, the devices and printers folder 500 is displayed on the PC 1 and displays for each driver the printers and the facsimiles that are usable by the PC 1. According to the present exemplary embodiment, a device 501 whose name is XYZ Defg and a device 503 whose name is Kmmn are displayed as usable devices. The device 501 displayed in the folder 500 corresponds to the MFP 7 illustrated in FIG. 1 and the device 503 corresponds to the MFP 3 illustrated in FIG. 1. A default mark 502 indicates a default device of the system, and FIG. 5A illustrates a state in which the device 501 is set as the default device. An icon of the device 501 expressed by dotted lines in the folder 500 indicates that the device 501 is in an unusable state, and the icon of the device 503 expressed by solid lines indicates that the device 503 is in the usable state.

Referring to FIG. 5B, a device management screen 600 is activated and displayed by the user selecting the device 503 in the devices and printers folder 500 illustrated in FIG. 5A. The MFP 3 can be managed using the device management screen 600. A device icon 601, a device name 602, and manufacturer information 603 are displayed in an upper portion of the device management screen 600. The data of the device icons is stored as a portion of a device management control file storing unit 905 illustrated in FIG. 10. Further, the device name 602 displays a device name of the device 503 in the folder 500, and the manufacturer information displays a character string designated in <dm: manufacturer> element 801 in a device management control file illustrated in FIG. 8.

Links to the functions associated with the device 503 are displayed in a lower portion of the device management screen 600. More specifically, a print setting button 607 and a photo print button 611 are displayed in the lower portion thereof. The print setting button 607 includes a button name 604, an icon 605, and a description of the button 606. The photo print button 611 includes a button name 608, an icon 609, and a description of the button 610. FIG. 5B illustrates an example in which the print setting button 607 of ID 1 and the photo print button 611 of ID 3 are displayed.

<dm: function> elements 804, 811, 818, and 826 in the device management control file illustrated in FIG. 8, which indicate each of the above-described buttons and functions, are described in <dm: functions> element 803 illustrated in FIG. 8.

Figure 6A:
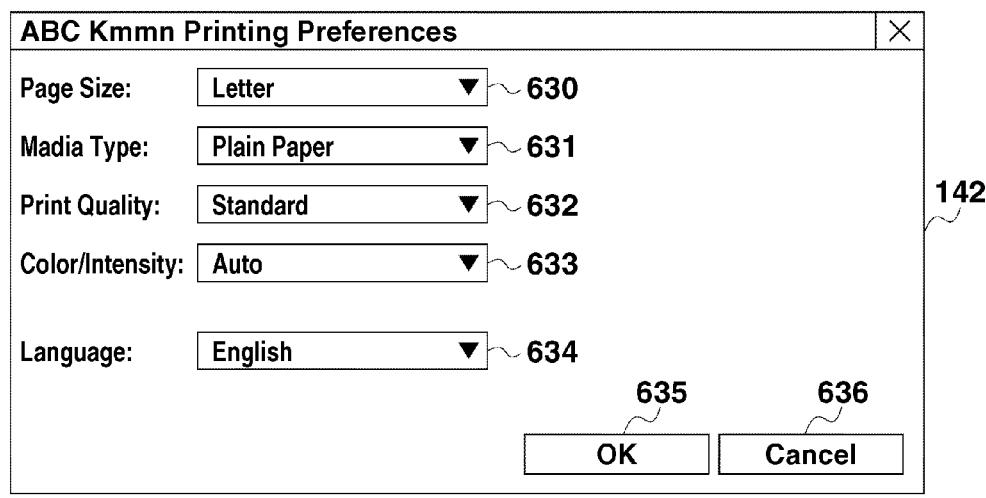
FIGS. 6A and 6B illustrate examples of a print setting screen of the printer driver displayed in English and in Japanese, respectively.
Figure 6B:
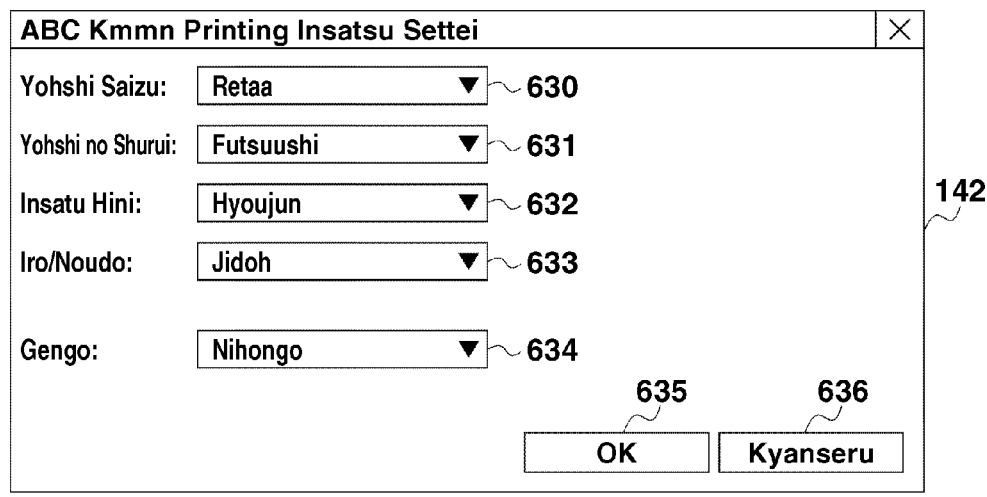

FIGS. 6A and 6B illustrate examples of the print setting screen of the printer driver in English and Japanese, respectively. Referring to FIGS. 6A and 6B, the UI module 35 in the printer driver 50 illustrated in FIG. 4 controls a print setting screen 142 as the print setting screen of the MFP 3. The user can select, via a language selection box 634, the display language of the print setting screen from languages described below.

| Choices of Language: | |
| --- | --- |
| <FIG. 6A> | <FIG. 6B> |
| English | Eigo |
| Japanese | Nihongo |

FIG. 6A illustrates a state where the user has selected English as the display language, and FIG. 6B illustrates a state where the user has selected Japanese (Nihongo) as the display language. (In the present specification and drawings, Japanese characters are written in Roman alphabet. However, actually, they are written in kana and kanji characters.) Print setting items and the display contents other than the display language are the same in FIGS. 6A and 6B.

In FIGS. 6A and 6B, a paper size selection box 630 allows the user to select from choices describe below the size of the paper for printing on the MFP 3. FIGS. 6A and 6B illustrate a state where the user has selected the "Letter" (Retaa) size.

| Choices of paper size: | |
| --- | --- |
| <FIG. 6A> | <FIG. 6B> |
| A5 | A5 |
| A4 | A4 |
| B5 | B5 |
| Letter | Retaa |

A paper type selection box 631 allows the user to select from choices describe below the type of paper to be used in printing on the MFP 3. FIGS. 6A and 6B illustrate a state where the user has selected "Plain paper" (Futsuushi) as the paper type.

| Choices of paper type: | |
|---|---|
| <FIG. 6A> | <FIG. 6B> |
| Plain paper | Futsuushi |
| Photo paper | Shashinyohshi |
| Postcard | Hagaki |

A print quality selection box 632 allows the user to select from choices describe below the print quality for printing on the MFP 3. FIGS. 6A and 6B illustrate a state where the user has selected "Standard" (Hyoujun) as the print quality.

| Choices of print quality: | |
|---|---|
| <FIG. 6A> | <FIG. 6B> |
| High | Kirei |
| Standard | Hyoujun |
| Fast | Hayai |

A color/density selection box 633 allows the user to select from choices describe below the color and density for printing on the MFP 3. FIGS. 6A and 6B illustrate a state where the user has selected "Auto" (Hyoujun) as the color and density.

| Choices of paper type: | |
|---|---|
| <FIG. 6A> | <FIG. 6B> |
| Auto | Jidou |
| Manual | Shudou |

If the user presses an OK button 635, the UI module 35 saves each of the selected print settings and closes the print setting screen 142. If the user presses a cancel button 636, the UI module 35 closes the print setting screen 142 and does not save each of the selected print settings.

Figure 7A:
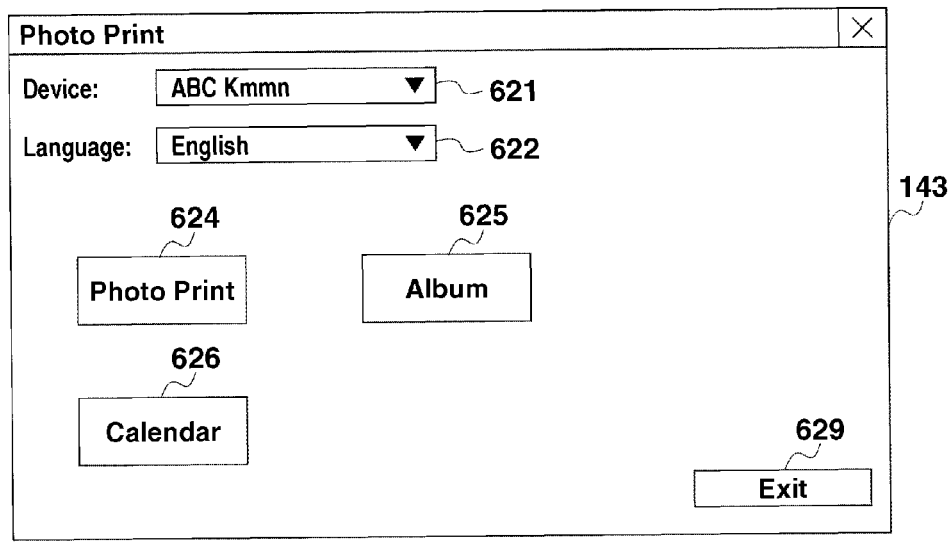
FIGS. 7A and 7B illustrate examples of a main screen of a photo print application displayed in English and in Japanese, respectively.
Figure 7B:
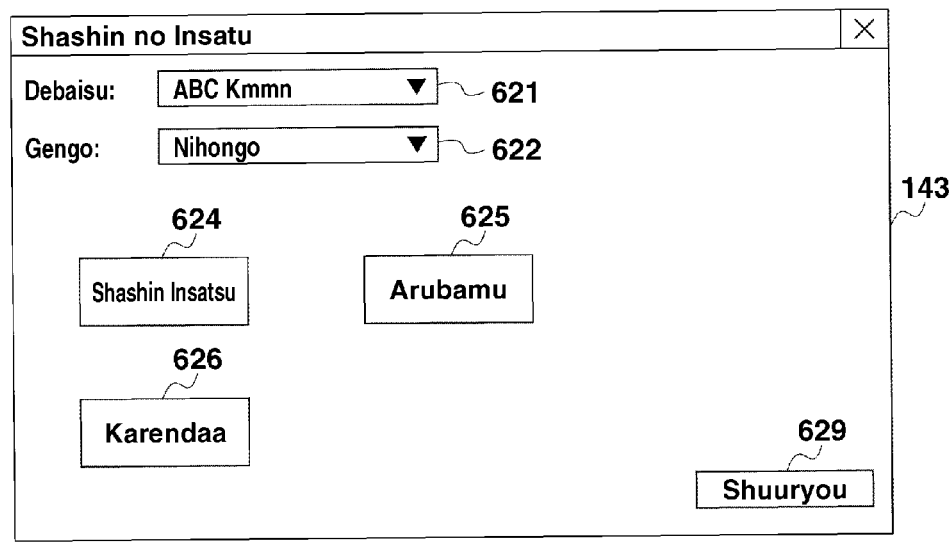

FIGS. 7A and 7B illustrate examples of the main screen of the photo print application 143. An application control unit 907 in the photo print application 143 illustrated in FIG. 10 to be described below controls the main screen of the photo print application 143. Referring to FIGS. 7A and 7B, the user can select, via a language selection box 622, a display language of the main screen of the photo print application from the choices described below.

| Choices of language: | |
|---|---|
| <FIG. 7A> | <FIG. 7B> |
| English | Eigo |
| Japanese | Nihongo |

FIG. 7A illustrates a state where the user has selected English (Eigo) as the display language, and FIG. 7B illustrates a state where the user has selected Japanese (Nihongo) as the display language. Print setting items and the display contents other than the display language are the same in FIGS. 7A and 7B.

A device selection box 621 allows the user to select from the devices displayed in the folder 500 the device (i.e., the printer) to be used in printing. FIGS. 7A and 7B illustrate a case where the user has selected ABC Kmmn indicating the device 503 (MFP 3) as such a device.

| Choices of device: | |
|---|---|
| <FIG. 7A> | <FIG. 7B> |
| ABC Kmmn | ABC Kmmn |
| XYZ Defg | XYZ Defg |

If the user presses a photo print button 624, a wizard (not illustrated) for easily printing the photo is activated. If the user presses an album print button 625, a wizard (not illustrated) for easily printing an album is activated. If the user presses a calendar print button 626, a wizard (not illustrated) for easily printing a calendar is activated. If the user presses an end button 628, the application control unit 907 illustrated in FIG. 10 closes the main screen and ends the photo print application 143.

FIGS. 8 and 9 illustrate contents of the device management control file. The information illustrated in FIGS. 8 and 9, i.e., the device management control file 800, is stored in the file storing unit 11 or 12 illustrated in FIG. 1. Referring to FIG. 8, the name of the manufacturer of the device (MFP 3), i.e., ABC corporation, is set in the <dm: manufacturer> element 801. The model name of the device (MFP 3), i.e., Kmmn, is set in a <dm: model> element 802. Such types of information are used when installing the device management control file 800. The device management control file 800 also describes information that is necessary for configuring the device management screen 600 illustrated in FIG. 5B.

More specifically, <dm: function> elements 804, 811, 818, and 826 set under the <dm: function> element 803 indicate each of the buttons and functions for displaying the print setting button 607 and the photo print button 611 on the device management screen 600. The device management screen 600 is activated and displayed when the MFP 3 is connected to the PC 1.

id="1" in the <dm: function> element 804 is an attribute indicating that an identification (ID) of the button to be displayed is 1.

An English character string "Printing Preferences" displayed as the button name 604 in the print setting button 607 of ID 1 is set in <dm: name xml: lang="en-US"> Printing Preferences </dm: name> element 805 under the <dm: function> element 804.

An English character string "Display the printing preferences window." displayed as the description of the button 606 in the print setting button 607 of ID 1 is set in <dm: description xml: lang="en-US"> Display the printing preferences window. </dm: description> element 806 under the <dm: function> element 804.

An icon file "preferences.ico" which is displayed as the icon 605 in the print setting button 607 of ID 1 is set in <dm: icon> preferences.ico </dm: icon> element 806 under the <dm: function> element 804.

A condition for displaying the print setting button 607 of ID 1 is described in <dm: required> element 808 under the <dm: function> element 804.

Registry information as a display condition of the print setting button 607 of ID 1 is set in <dm: keywordInRegistry key="HKDM¥SOFTWARE¥ABC¥Printer Driver" name="language">English</dm: keywordInRegistry> element 809 under the <dm: function> element 804. When the registry information described below exists, the print setting button 607 of ID 1 is displayed. (In this document, a Latin letter Y with a single or double horizontal stroke (visible as a currency sign used by the currencies Chinese yuan and the Japanese yen) may be understood to be a backslash (reverse slant) typographical mark in ASCII.)

HKEY_LOCAL_MACHINE¥SOFTWARE¥ABC¥Printer Driver¥
Name: Language
Type: REG_SZ
Data: English A code indicating a function (program) for displaying the print setting screen 142 illustrated in FIGS. 6A and 6B, i.e., printingPreferences "ABC Kmmn"
is set to <dm: execute>printingPreferences "ABC Kmmn"</dm: execute> element 810 under the <dm: function> element 804. "ABC Kmmn" is an argument for designating the print setting screen 142 of the MFP 3.

Figure 17A:
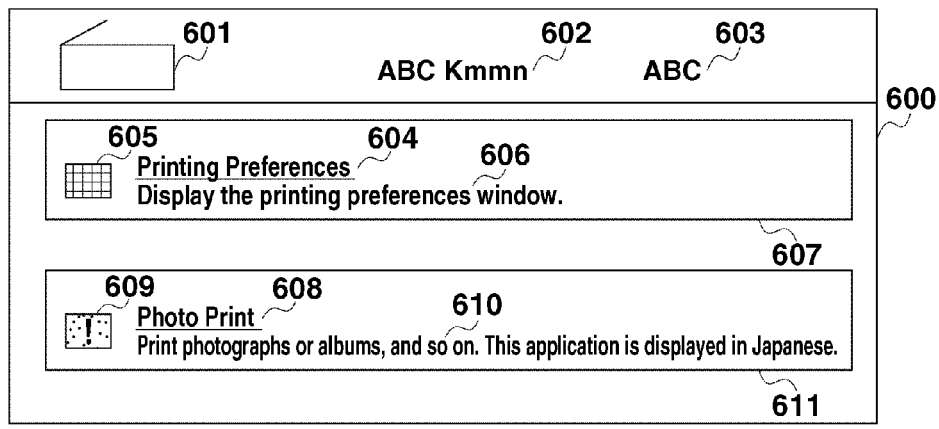
FIGS. 17A, 17B, and 17C illustrate examples of the device management screen displayed in English (FIG. 17A) and in Japanese (FIGS. 17B and 17C).

FIGS. 5B and 17A illustrate examples of cases where the above-described print setting button 607 of ID 1 is displayed. If the user presses the print setting button 607 of ID 1 displayed on the device management screen 600 illustrated in FIG. 5B, the print setting screen 142 of the MFP 3 is activated according to a flow to be described below with reference to FIG. 15. The English print setting screen 142 illustrated in FIG. 6A is then displayed. It is assumed that the current display language of the OS is Japanese. According to the exemplary embodiment of the present invention, the button name 604 and the description of the button 606 in the print setting button 607 of ID1 are displayed in the same language as the display language of the print setting screen 142 selected by the user, even when the display languages of the OS and the print setting screen 142 are different. The user operability is thus improved.

id="2" in the <dm: function> element 811 is an attribute indicating that the ID of the button is 2.

A Japanese character string "Insatsu Settei" displayed as the button name 604 in the print setting button 607 of ID 2 is set in <dm: name xml: lang="ja-JP"> Insatsu Settei </dm: name> element 812 under the <dm: function> element 811.

A Japanese character string "Insatsu settei gamen o hyouji suru." displayed as the description of the button 606 in the print setting button 607 of ID 2 is set in <dm: description xml: lang="ja-JP"> Insatsu settei gamen o hyouji suru.</dm: description> element 813 under the <dm: function> element 811.

An icon file "preferences.ico" which is displayed as the icon 605 in the print setting button 607 of ID 2 is set in <dm: icon> preferences.ico </dm: icon> element 814 under the <dm: function> element 811.

A condition for displaying the print setting button 607 of ID 2 is described in <dm: required> element 815 under the <dm: function> element 811.

Registry information as a display condition of the print setting button 607 of ID 2 is set in <dm: keywordInRegistry key="HKDM¥SOFTWARE¥ABC¥Printer Driver" name="language">Japanese</dm: keywordInRegistry> element 816 under the <dm: function> element 811. When the registry information described below exists, the print setting button 607 of ID 2 is displayed.

HKEY_LOCAL_MACHINE¥SOFTWARE¥ABC¥Printer Driver¥
Name: Language
Type: REG_SZ
Data: Japanese A code indicating a function (program) for displaying the print setting screen 142 illustrated in FIGS. 6A and 6B, i.e., printingPreferences "ABC Kmmn"
is set to <dm: execute>printingPreferences "ABC Kmmn"</dm: execute> element 817 under the <dm: function> element 811. "ABC Kmmn" is an argument for designating the print setting screen 142 of the MFP 3.

Figure 17B:
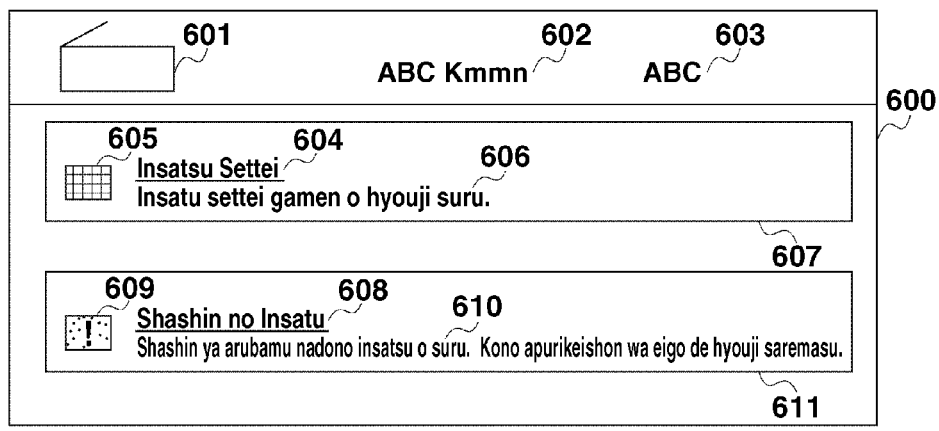
Figure 17C:
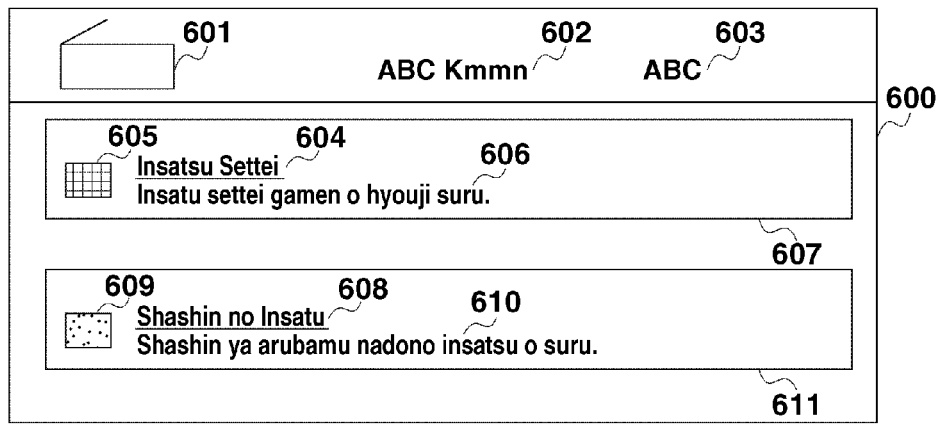

FIGS. 17B and 17C illustrate examples of cases where the above-described print setting button 607 of ID 2 is displayed in the device management screen 600. If the user presses the print setting button 607 of ID 2, the print setting screen 142 for the MFP 3 is activated according to a flow to be described below with reference to FIG. 15. The Japanese print setting screen 142 illustrated in FIG. 6B is then displayed.

It is assumed that the current display language of the OS is English. According to the exemplary embodiment of the present invention, the button name 604 and the description of the button 606 in the print setting button 607 of ID 2 are displayed in the same language as the display language of the print setting screen 142 selected by the user, even when the display languages of the OS and the print setting screen 142 are different. The user operability is thus improved.

id="3" in the <dm: function> element 818 is an attribute indicating that the ID of the button is 3.

An English character string "Photo Print" displayed as the button name 608 in the photo button 611 of ID 3 is set in <dm: name xml: lang="en-US"> Photo Print </dm: name> element 819 under the <dm: function> element 818.

An English character string "Print photographs or albums, and so on." displayed as the description of the button 610 in the photo button 611 of ID 3 is set in <dm: description xml: lang="en-US"> Print photographs or albums, and so on. </dm: description> element 819 under the <dm: function> element 818.

An icon file "photo.ico" which is displayed as the icon 609 in the photo button 611 of ID 3 is set in <dm: icon> photo.ico </dm: icon> element 821 under the <dm: function> element 818.

A condition for displaying the photo button 611 of ID 3 is described in <dm: required> element 822 under the <dm: function> element 818.

Two pieces of Registry information as the display conditions of the photo print button 611 of ID 3 are set in <dm: keywordInRegistry key="HKDM¥SOFTWARE¥ABC¥Printer Driver" name="Language">English</dm: keywordInRegistry> element 823 and <dm: keywordInRegistry key="HKDM¥SOFTWARE¥ABC¥Photo Print" name="Language">English</dm: keywordInRegistry> element 823 under the <dm: function> element 818. When the registry information described below exists, the photo print button 611 of ID 3 is displayed.

HKEY_LOCAL_MACHINE¥SOFTWARE¥ABC¥Printer Driver¥
Name: Language
Type: REG_SZ
Data: English
HKEY_LOCAL_MACHINE¥SOFTWARE¥ABC¥Photo Print¥
Name: Language
Type: REG_SZ
Data: English A code indicating a function (program) for displaying the photo print application 143 illustrated in FIG. 7A, i.e., PhotoPrint.exe "ABC Kmmn"
is set to <dm: execute> PhotoPrint.exe "ABC Kmmn"</dm: execute> element 825 under the <dm: function> element 818. "ABC Kmmn" is an argument for designating the device 503 (MFP 3) as the device displayed by the device selection box 621 when activating the photo print application 143.

FIG. 5B illustrates an example of a case where the above-described photo print button 611 of ID 3 is displayed in the device management screen 600. If the user presses the displayed photo print button 611 of ID 3, the photo print application 143 is activated while the device 503 (MFP 3) is selected in the device selection box 621, according to the flow described below with reference to FIG. 16. The main screen of the photo print application 143 in English illustrated in FIG. 7A is then displayed.

It is assumed that the current display language of the OS is Japanese. According to the exemplary embodiment of the present invention, the button name 608 and the description of the button 610 in the photo print button 611 of ID3 are displayed in the same language as the display language of the main screen of the photo print application 143 selected by the user, even when the display languages of the OS and main screen of the photo print application 143 are different. The user operability is thus improved.

id="4" in the <dm: function> element 826 is an attribute indicating that the ID of the button is 4.

An English character string "Photo Print" displayed asn the button name 608 in the photo button 611 of ID 4 is set in <dm: name xml: lang="en-US"> Photo Print </dm: name> element 827 under the <dm: function> element 826.

An English character string "Print photographs or albums, and so on. This application is displayed in Japanese." displayed as the description of the button 610 in the photo button 611 of ID 4 is set in <dm: description xml: lang="en-US"> D Print photographs or albums, and so on. This application is displayed in Japanese.</dm: description> element 828 under the <dm: function> element 826.

An icon file "photo_warning.ico" which is displayed as the icon 609 in the photo button 611 of ID 4 is set in <dm: icon> photo_warning.ico </dm: icon> element 829 under the <dm: function> element 826. An exclamation mark "!" is added to the general icon file "photo.ico" in the above-described icon file.

A condition for displaying the photo button 611 of ID 4 is described in <dm: required> element 830 under the <dm: function> element 826.

Two pieces of Registry information as the display conditions of the photo print button 611 of ID 4 are set in <dm: keywordInRegistry key="HKDM¥SOFTWARE¥ABC¥Printer Driver" name="Language">English</dm: keywordInRegistry> element 831 and <dm: keywordInRegistry key="HKDM¥SOFTWARE¥ABC¥Photo Print" name="Language">Japanese</dm: keywordInRegistry> element 832 under the <dm: function> element 826. When the registry information described below exists, the photo print button 611 of ID 4 is displayed.

HKEY_LOCAL_MACHINE¥SOFTWARE¥ABC¥Printer Driver¥
Name: Language
Type: REG_SZ
Data: English
HKEY_LOCAL_MACHINE¥SOFTWARE¥ABC¥Photo Print¥
Name: Language
Type: REG_SZ
Data: Japanese A code indicating a function (program) for displaying the photo print application 143, i.e.,
PhotoPrint.exe "ABC Kmmn"
is set to <dm: execute> PhotoPrint.exe "ABC Kmmn"</dm: execute> element 833 under the <dm: function> element 826. "ABC Kmmn" is an argument for designating the device 503 (MFP 3) as the device displayed by the device selection box 621 when activating the photo print application 143.

FIG. 17A illustrates an example of a case where the above-described photo print button 611 of ID 4 is d splayed in the device management screen 600. If the user presses the displayed photo print button 611 of ID 4, the photo print application 143 is activated while the device 503 (MFP 3) is selected in the device selection box 621, according to the flow described below with reference to FIG. 16. The main screen of the photo print application 143 in Japanese illustrated in FIG. 7B is then displayed.

As described above, the English character strings are displayed in the button name 608 and the description of the button 610 in the photo print button 611 of ID 4 displayed on the device management screen 600 illustrated in FIG. 17A. However, if the user then presses the photo print button 611, the Japanese main menu of the photo print application 143 illustrated in FIG. 7B is displayed, so that the user may become confused. To solve such a problem, according to the present exemplary embodiment, a message "This application is displayed in Japanese" is added to the character string displayed as the description of the button 610 in the photo print button 611 of ID 4. This is to warn the user in advance that the photo print application to be activated is in Japanese. Further, the icon file "photo_warning.ico" to which the exclamation mark "!" is added is used as the icon 609 in the photo print button 611 of ID 4. The user is thus warned in advance before activating the photo print application 143.

id="5" in the <dm: function> element 834 is an attribute indicating that the ID of the button is 5.

A Japanese character string "Shashin no Insatsu" displayed as the button name 608 in the photo print button 611 of ID 5 is set in <dm: name xml: lang="ja-JP"> Shashin no Insatsu </dm: name> element 835 under the <dm: function> element 834.

A Japanese character string "Shashin ya arubamu nadono insatsu o suru. Kono apurikeishon wa eigo de hyouji saremasu." displayed as the description of the button 610 in the photo print button 611 of ID 5 is set in <dm: description xml: lang="ja-JP"> Shashin ya arubamu nadono insatsu o suru. Kono apurikeishon wa eigo de hyouji saremasu.</dm: description> element 836 under the <dm: function> element 834.

An icon file "photo_warning.ico" which is displayed as the icon 609 in the photo button 611 of ID 5 is set in <dm: icon> photo_warning.ico </dm: icon> element 837 under the <dm: function> element 834. An exclamation mark "!" is added to the general icon file "photo ico" in the above-described icon file.

A condition for displaying the photo button 611 of ID 5 is described in <dm: required> element 838 under the <dm: function> element 834.

Two pieces of Registry information as the display conditions of the photo print button 611 of ID 5 are set in <dm: keywordInRegistry key="HKDM¥SOFTWARE¥ABC¥Printer Driver" name="Language">Japanese</dm: keywordInRegistry> element 839 and <dm: keywordInRegistry key="HKDM¥SOFTWARE¥ABC¥Photo Print" name="Language">English</dm: keywordInRegistry> element 840 under the <dm: function> element 834. When the registry information described below exists, the photo print button 611 of ID 5 is displayed.

HKEY_LOCAL_MACHINE¥SOFTWARE¥ABC¥Printer Driver¥
Name: Language

Type: REG_SZ
Data: Japanese
HKEY_LOCAL_MACHINE¥SOFTWARE¥ABC¥Photo Print¥
Name: Language
Type: REG_SZ
Data: English A code indicating a function (program) for displaying the photo print application 143, i.e.,
PhotoPrint.exe "ABC Kmmn"
is set to <dm: execute> PhotoPrint.exe "ABC Kmmn"</dm: execute> element 841 under the <dm: function> element 831. "ABC Kmmn" is an argument for designating the device 503 (MFP 3) as the device displayed by the device selection box 621 when activating the photo print application 143.

FIG. 17B illustrates an example of a case where the above-described photo print button 611 of ID 5 is displayed in the device management screen 600. If the user presses the displayed photo print button 611 of ID 5, the photo print application 143 is activated while the device 503 (MFP 3) is selected in the device selection box 621, according to the flow described below with reference to FIG. 16. The main screen of the photo print application 143 in English illustrated in FIG. 7A is then displayed.

As described above, the Japanese character strings are displayed in the button name 608 and the description of the button 610 in the photo print button 611 of ID 4 displayed on the device management screen 600 illustrated in FIG. 17B. However, if the user presses the photo print button 611, the Japanese main menu of the photo print application 143 illustrated in FIG. 7A is displayed, so that the user may become confused. To solve such a problem, according to the present exemplary embodiment, a message "Kono apurikeishon wa eigo de hyouji saremasu." is added to the character string displayed as the description of the button 610 in the photo print button 611 of ID 5. This is to warn the user in advance that the photo print application to be activated is in English. Further, the icon file photo_warning.ico to which the exclamation mark "!" is added is used as the icon 609 in the photo print button 611 of ID 5. The user is thus warned in advance before activating the photo print application 143. Such a message and an icon are one of the features of the present invention.

id="6" in the <dm: function> element 842 is an attribute indicating that the ID of the button is 6.

A Japanese character string "Shashin no Insatsu" displayed as the button name 608 in the photo print button 611 of ID 6 is set in <dm: name xml: lang="ja-JP"> Shashin no Insatsu </dm: name> element 843 under the <dm: function> element 842.

A Japanese character string "Shashin ya arubamu nadono insatsu o suru." displayed as the description of the button 610 in the photo print button 611 of ID 6 is set in <dm: description xml: lang="ja-JP"> Shashin ya arubamu nadono insatsu o suru.</dm: description> element 844 under the <dm: function> element 842.

An icon file "photo.ico" which is displayed as the icon 609 in the photo button 611 of ID 6 is set in <dm: icon> photo.ico </dm: icon> element 845 under the <dm: function> element 842.

A condition for displaying the photo button 611 of ID 6 is described in <dm: required> element 846 under the <dm: function> element 842.

Two pieces of Registry information as the display conditions of the photo print button 611 of ID 6 are set in <dm: keywordInRegistry key="HKDM¥SOFTWARE¥ABC¥Printer Driver" name="Language">Japanese</dm: keywordInRegistry> element 847 and <dm: keywordInRegistry key="HKDM¥SOFTWARE¥ABC¥Photo Print" name="Language">Japanese</dm: keywordInRegistry> element 848 under the <dm: function> element 842. When the registry information described below exists, the photo print button 611 of ID 6 is displayed.
HKEY_LOCAL_MACHINE¥SOFTWARE¥ABC¥Printer Driver¥
Name: Language
Type: REG_SZ
Data: Japanese
HKEY_LOCAL_MACHINE¥SOFTWARE¥ABC¥Photo Print¥
Name: Language
Type: REG_SZ
Data: Japanese A code indicating a function (program) for displaying the photo print application 143, i.e.,
PhotoPrint.exe "ABC Kmmn"
is set to <dm: execute> PhotoPrint.exe "ABC Kmmn"</dm: execute> element 849 under the <dm: function> element 842. "ABC Kmmn" is an argument for designating the device 503 (MFP 3) as the device displayed by the device selection box 621 when activating the photo print application 143.

FIG. 17C illustrates an example of a case where the above-described photo print button 611 of ID 6 is displayed in the device management screen 600. If the user presses the displayed photo print button 611 of ID 6, the photo print application 143 is activated while the device 503 (MFP 3) is selected in the device selection box 621, according to the flow described below with reference to FIG. 16. The main screen of the photo print application 143 in Japanese illustrated in FIG. 7B is then displayed.

It is assumed that the current display language of the OS is English. According to the exemplary embodiment of the present invention, the button name 608 and the description of the button 610 in the photo print button 611 of ID 6 are displayed in the same language as the display language of the main screen of the photo print application 143 selected by the user, even when the display languages of the OS and main screen of the photo print application 143 are different. The user operability is thus improved.

Figure 10:
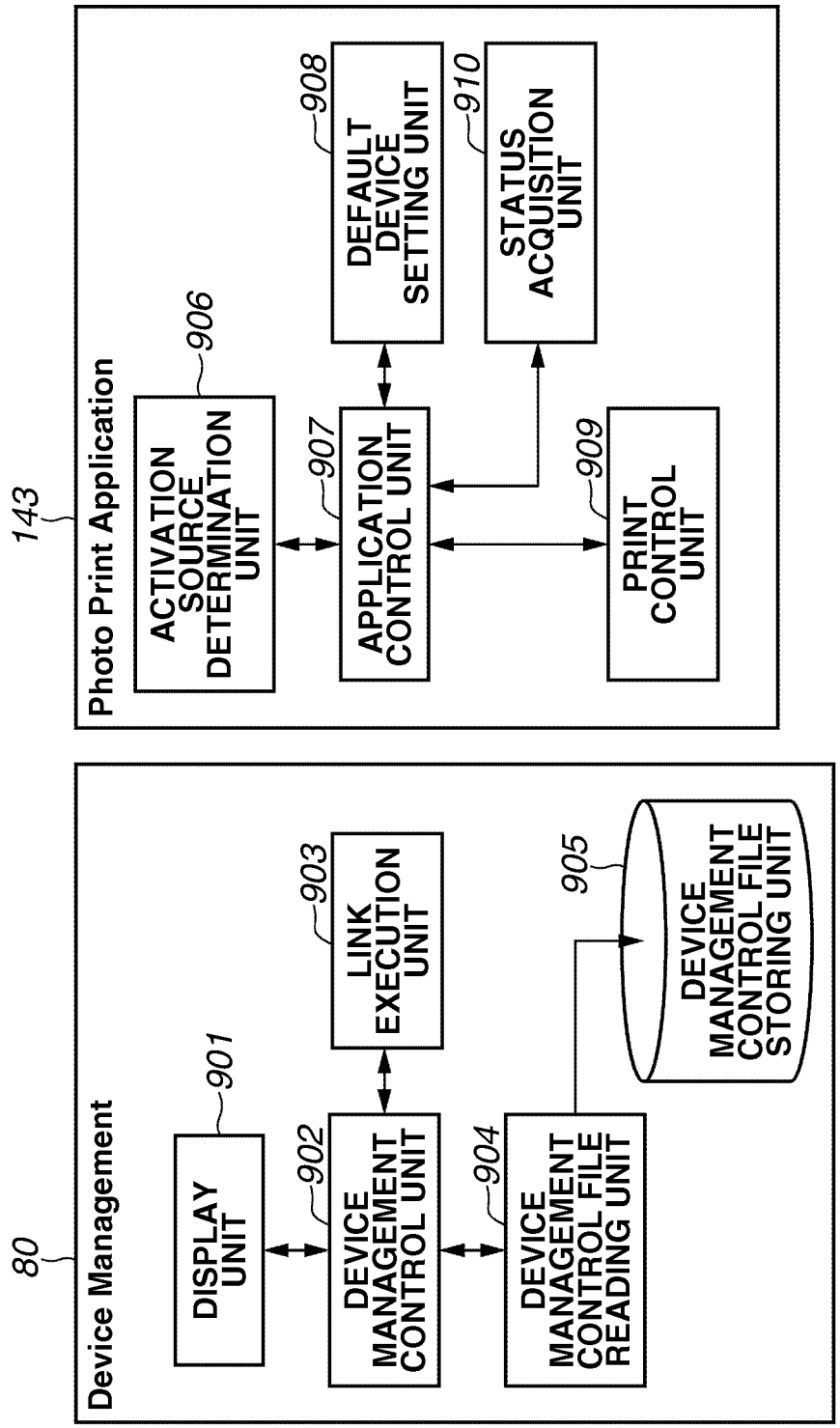
FIG. 10 illustrates examples of software configurations of a device management application and the photo print application.

FIG. 10 illustrates an example of the software configuration of the device management and the photo print applications. Referring to FIG. 10, the device management application 80 includes a display unit 901, a device management control unit 902, a link execution unit 903, a device management control file reading unit 904, and the device management control file storing unit 905. The device management control file storing unit 905 stores the device management control file 800 saved in step S1405 illustrated in FIG. 12 to be described below.

The photo print application 142 includes an activation source determination unit 906, an application control unit 907, a default device setting unit 908, a print control unit 909, and a status acquisition unit 910. The print control unit 909 is a module that prints, when the MFP 3 prints a photograph processed on the photo print application 143, by performing print layout processing. The status acquisition unit 910 is a module that monitors the status of the MFP 3 via the printer driver 50 and acquires a control command indicating the status of the MFP 3. The device management screen 600 is activated and displayed by the MFP 3 being connected to the PC 1 via the network 4, or the user selecting the device within the folder 500 illustrated in FIG. 5A. An example in which the MFP 3 is connected to the PC 1 via the network 4 so that the device management screen 600 illustrated in FIGS. 5B, 17A, 17B, and 17C is activated and displayed according to the present exemplary embodiment will be described below.

Figure 11:
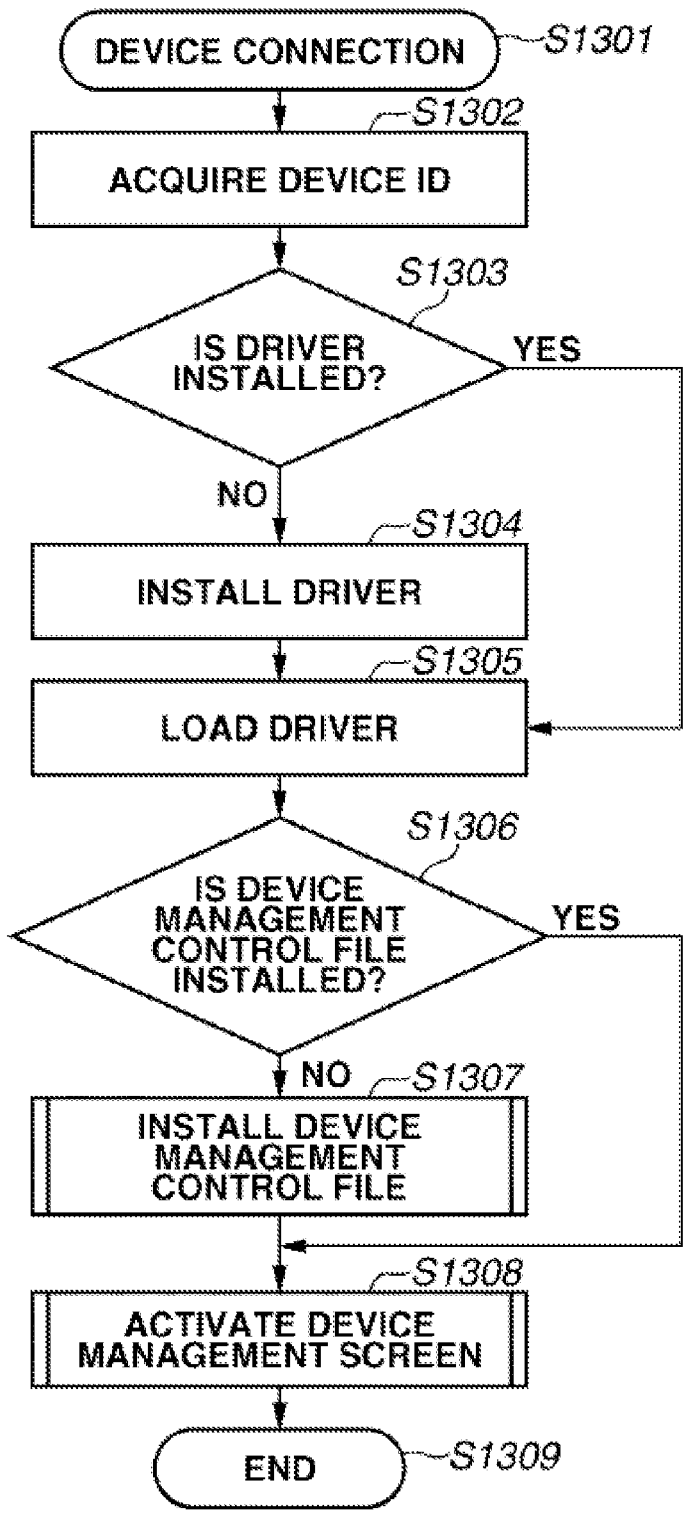
FIG. 11 is a flowchart illustrating an example of a process performed when connecting a device.

FIG. 11 is a flowchart illustrating an example of a process performed when the device is connected to the PC. A program according to the flowchart illustrated in FIG. 11 is stored in the HDD 202, read by the RAM 201, and executed by the CPU 204 in the PC illustrated in FIG. 2A.

In step S1301, the device (i.e., MFP 3) is connected to the PC (i.e., PC 1) via the network 4. In step S1302, the PC 1 acquires the device ID. The device ID is expressed by a character string such as "MFG: ABC; MDL: Kmmn; CLS: PRINTER; CMD: K4; DES: ANC 1 Kmmn;". Such a character string is the device ID of the printer function in the MFP 3 which the PC 1 can acquire from the MFP 3 via the network 4 and indicates the information described below.
Manufacturer (MFG:): ABC
Model (MDL:): Kmmn
Class (CLS:): PRINTER
Command (CMD:): K4 (private print control command of ABC Corporation)
Description (DES:): ABC Kmmn In step S1303, the device management application 80 determines whether the driver (i.e., the printer driver 50, the facsimile driver, or the scanner driver (not illustrated)) is previously installed in the PC 1. Hereinafter, the driver (the printer driver 50, the facsimile driver, or the scanner driver) in the description of the flowchart illustrated in FIG. 11 will be referred to as the driver.

If the device management application 80 determines that the driver is not yet installed (NO in step S1303), the process proceeds to step S1304. In step S1304, the OS installs the driver. In step S1305, the OS loads the driver. When the driver is correctly installed, the device (MFP 3) becomes registered in the folder 500 illustrated in FIG. 5A.

In step S1306, the device management application 80 determines whether the device management control file 800 illustrated in FIG. 8 and FIG. 9 is previously installed in the PC 1. The device management application 80 determines whether the installed device management control file matches the driver based on the manufacturer (MFG:) and the model (MDL:) information included in the device ID. If the device management application 80 determines that the device management control file 800 is not yet installed (NO in step S1306), the process proceeds to step S1307. In step S1307, the device management application 80 executes the process for installing the device management control file 800 to be described below with reference to FIG. 12. In step S1308, the device management application 80 performs the process for activating the device management screen to be described below with reference to FIG. 13. In step S1309, the device management application 80 ends the process performed when connecting the device. If the device management application 80 determines that the device management control file 800 is installed (YES in step S1306), the process proceeds to step S1308. If the device management application 80 determines that the driver is installed (YES in step S1303), the process proceeds to step S1305.

Figure 12:
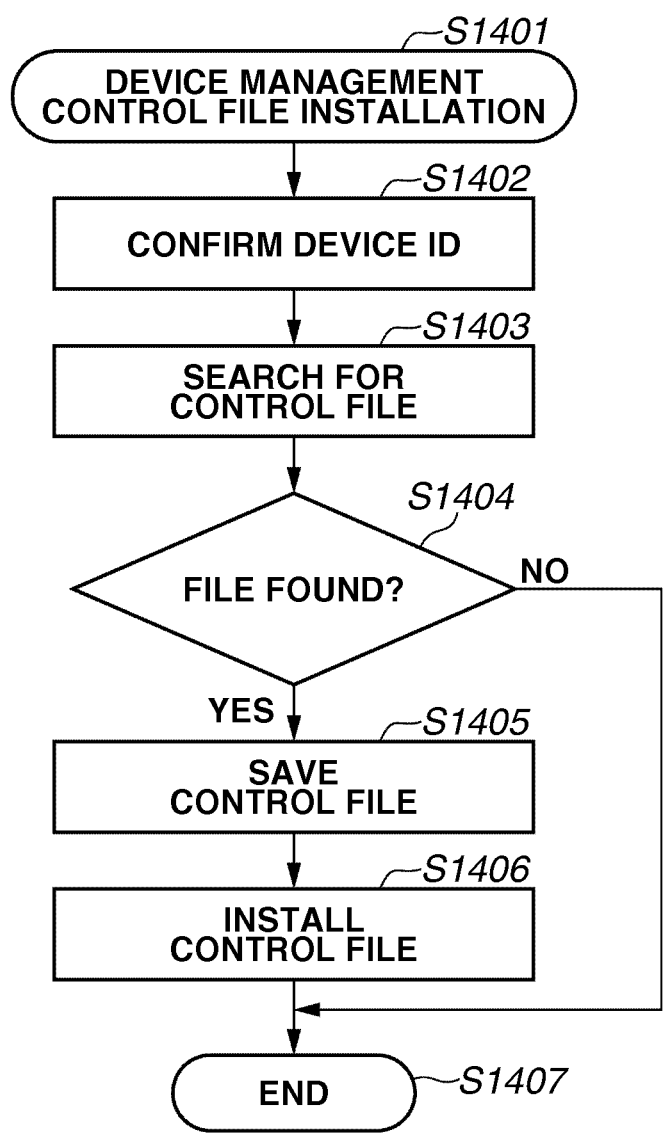
FIG. 12 is a flowchart illustrating an example of a process for installing the device management control file.

FIG. 12 is a flowchart illustrating an example of a process for installing the device management control file. The program according to the flowchart illustrated in FIG. 12 is stored in the HDD 202, read by the RAM 201, and executed by the CPU 204 in the PC illustrated in FIG. 2A.

In step S1401, the device management application 80 starts installing the device management control file after the process for installing the device management control file is executed in step S1307 illustrated in FIG. 11. In step S1402, the device management application 80 confirms the device ID of the device (MFP 3) connected via the network 4. In step S1403, the device management application 80 searches for the device management control file 800 of the device (MFP 3) connected to the PC 1 using the manufacturer (MFG:) and the model (MDL:) information included in the device ID. The manufacturer (MFG:) "ABC", and the model (MDL:) "Kmmn" corresponding to the device (MFP 3) are described in the <dm: manufacturer> element 801 and the <dm: model> element 802 of the device management control file 800 illustrated in FIGS. 8 and 9.

The device management application 80 then searches the file storing unit 11 or 12 in the Web server 9 or the CD-ROM 10 inserted in the PC 1 for the device management control file 800 of the device (MFP 3), using the information described in the elements 801 and 802. In step S1404, the device management application 80 determines whether the device management control file 800 is found in the file storing unit 11 or 12. If the device management control file 800 is found (YES in step S1404), the process proceeds to step S1405. In step S1405, the device management application 80 stores the device management control file 800 in a predetermined position in the HDD 202 of the PC 1. In step S1406, the device management application 80 installs the device management control file 800. In step S1407, the device management application 80 ends the process for installing the device management control file after installing the file.

According to the present exemplary embodiment, it is assumed that the device management control file 800 is found and installed. On the other hand, if the device management control file 800 is not found (NO in step S1404), the process proceeds to step S1407. In step S1407, the device management application 80 ends the process for installing the device management control file without installing the file.

Figure 13:
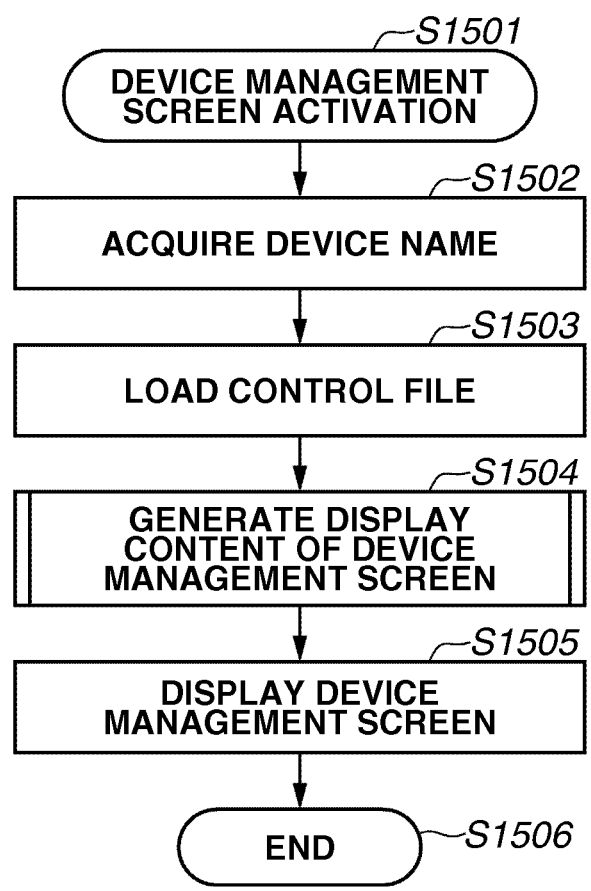
FIG. 13 is a flowchart illustrating an example of a process for activating the device management screen.

FIG. 13 is a flowchart illustrating an example of a process for activating the device management screen. The program according to the flowchart illustrated in FIG. 13 is stored in the HDD 202, read by the RAM 201, and executed by the CPU 204 in the PC illustrated in FIG. 2A.

In step S1501, the device management application 80 starts the process for activating the device management screen after executing the process for activating the device management screen in step S1308 illustrated in FIG. 11. The device management application 80 also starts activating the device management screen when the user has selected the device 503 in the folder 500.

In step S1502, the device management control unit 902 acquires the device name that the user has selected in the folder 500. According to the present exemplary embodiment, since the user has selected the device 503, the device management control unit 902 acquires the device name "ABC Kmmn". In step S1503, the device management control file reading unit 904 loads, based on the device name, the device management control file 800 illustrated in FIGS. 8 and 9 stored in step S1405 illustrated in FIG. 12. In step S1504, the device management control unit 902 executes the process for generating the display content of the device management screen to be described below with reference to FIG. 14, using the device management control file 800. In step S1505, the device management control unit 902 displays the device management screen 600 via the display unit 901 according to the display content of the device management screen generated in step S1504. In step S1506, the device management application 80 ends the process for activating the device management screen.

Figure 14:
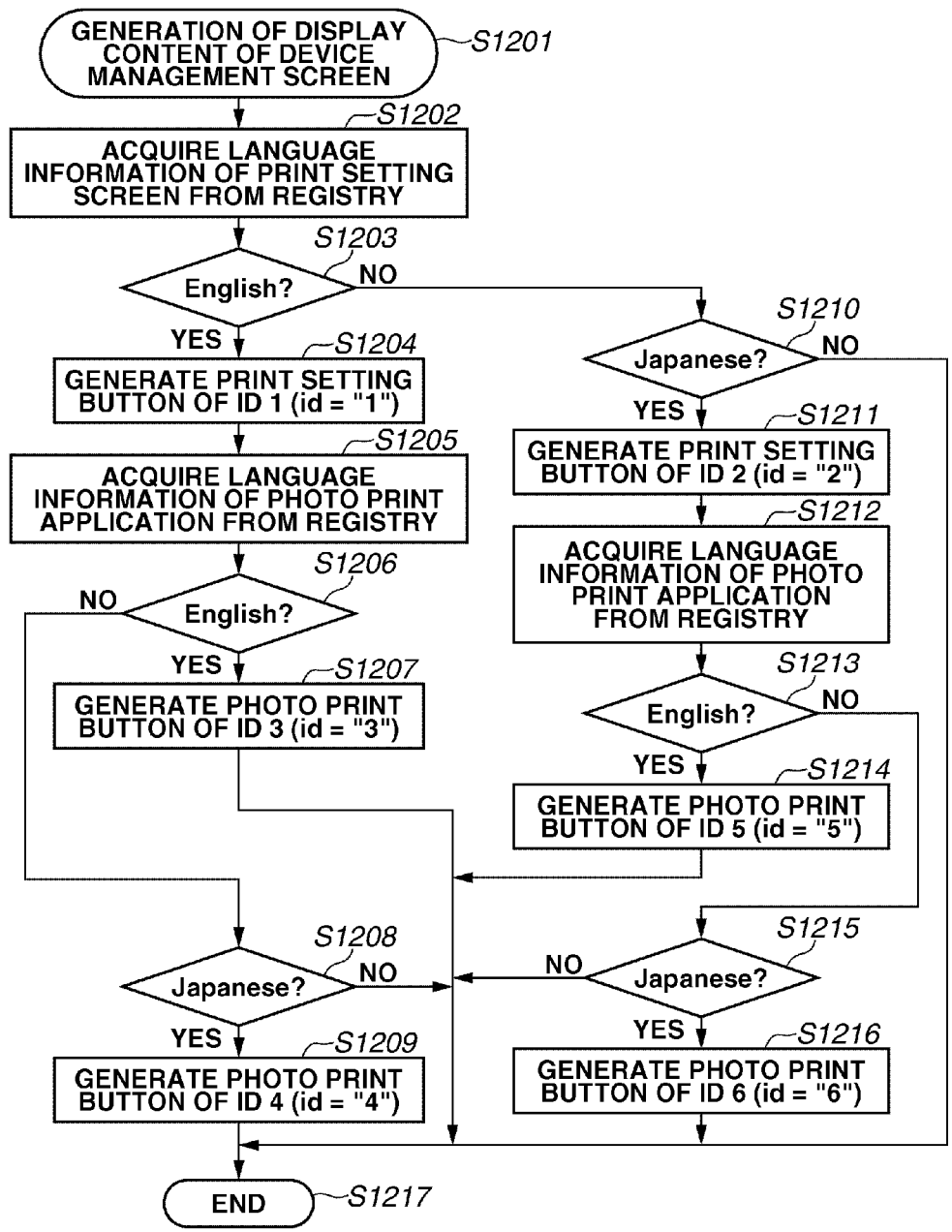
FIG. 14 is a flowchart illustrating an example of a process for generating a display content of the device management screen.

FIG. 14 is a flowchart of an example of a process for generating the display content of the device management screen. The program according to the flowchart illustrated in FIG. 14 is stored in the HDD 202, read by the RAM 201, and executed by the CPU 204 in the PC illustrated in FIG. 2A.

In step S1201, the device management control unit 902 starts the process for generating the display content of the device management screen after executing the process in step S1504 illustrated in FIG. 13.

In step S1202, the device management control unit 902 acquires from the registry described below the language information of the print setting screen 142 set as a value (data) in the registry.

HKEY_LOCAL_MACHINE¥SOFTWARE¥ABC¥Printer Driver¥
Name: Language
Type: REG_SZ

In step S1203, the device management control unit 902 confirms the language information of the print setting screen 142 set in the registry described below. If the language is English (YES in step S1203), the process proceeds to step S1204. If the language is other than English (NO in step S1203), the process proceeds to step S1210.

HKEY_LOCAL_MACHINE¥SOFTWARE¥ABC¥Printer Driver¥
Name: Language
Type: REG_SZ

In step S1204, the device management control unit 902 generates the print setting button 607 of ID 1 (id="1"). In step S1205, the device management control unit 902 acquires from the registry described below the language information of the main screen of the photo print application 143 set as a value (data) in the registry.

HKEY_LOCAL_MACHINE¥SOFTWARE¥ABC¥Photo Print¥
Name: Language
Type: REG_SZ

In step S1206, the device management control unit 902 confirms the language information of the main screen of the photo print application 143 set in the registry described below. If the language is English (YES in step S1206), the process proceeds to step S1207. If the language is other than English (NO in step S1206), the process proceeds to step S1208.

HKEY_LOCAL_MACHINE¥SOFTWARE¥ABC¥Photo Print¥
Name: Language
Type: REG_SZ

In step S1207, the device management control unit 902 generates the photo print button 611 of ID 3 (id="3"). In step S1217, the device management control unit 902 ends the process for generating the display content of the device management screen. In step S1208, the device management control unit 902 confirms the language information of the main screen of the photo print application 143 set to the registry described below. If the language is Japanese (YES in step S1208), the process proceeds to step S1209. If the language is other than Japanese (NO in step S1208), the process proceeds to step S1217, and the device management control unit 902 ends the process for generating the display content of the device management screen.

HKEY_LOCAL_MACHINE¥SOFTWARE¥ABC¥Photo Print¥
Name: Language
Type: REG_SZ

In step S1209, the device management control unit 902 generates the photo print button 611 of ID 4 (id="4"). In step S1217, the device management control unit 902 ends the process for generating the display content of the device management screen. In step S1210, the device management control unit 902 confirms the language information of the print setting screen 142 set in the registry described below. If the language is Japanese (YES in step S1210), the process proceeds to step S1211. If the language is other than Japanese (NO in step S1210), the process proceeds to step S1217, and the device management control unit 902 ends the process for generating the display content of the device management screen.

HKEY_LOCAL_MACHINE¥SOFTWARE¥ABC¥Printer Driver¥
Name: Language
Type: REG_SZ

In step S1211, the device management control unit 902 generates the print setting button 607 of ID 2 (id="2"). In step S1212, the device management control unit 902 acquires from the registry described below the language information of the main screen of the photo print application 143 set as a value (data) in the registry.

HKEY_LOCAL_MACHINE¥SOFTWARE¥ABC¥Photo Print¥
Name: Language
Type: REG_SZ

In step S1213, the device management control unit 902 confirms the language information of the main screen of the photo print application 143 set in the registry described below. If the language is English (YES in step S1213), the process proceeds to step S1214. If the language is other than English (NO in step S1213), the process proceeds to step S1215.

HKEY_LOCAL_MACHINE¥SOFTWARE¥ABC¥Photo Print¥
Name: Language
Type: REG_SZ

In step S1214, the device management control unit 902 generates the photo print button 611 of ID 5 (id="5"). In step S1217, the device management control unit 902 ends the process for generating the display content of the device management screen. In step S1215, the device management control unit 902 confirms the language information of the main screen of the photo print application 143 set in the registry described below. If the language is Japanese (YES in step S1215), the process proceeds to step S1216. If the language is other than Japanese (NO in step S1215), the process proceeds to step S1217, and the device management control unit 902 ends the process for generating the display content of the device management screen.

HKEY_LOCAL_MACHINE¥SOFTWARE¥ABC¥Photo Print¥
Name: Language
Type: REG_SZ

In step S1216, the device management control unit 902 generates the photo print button 611 of ID 6 (id="6"). In step S1217, the device management control unit 902 ends the process for generating the display content of the device management screen.

Figure 15:
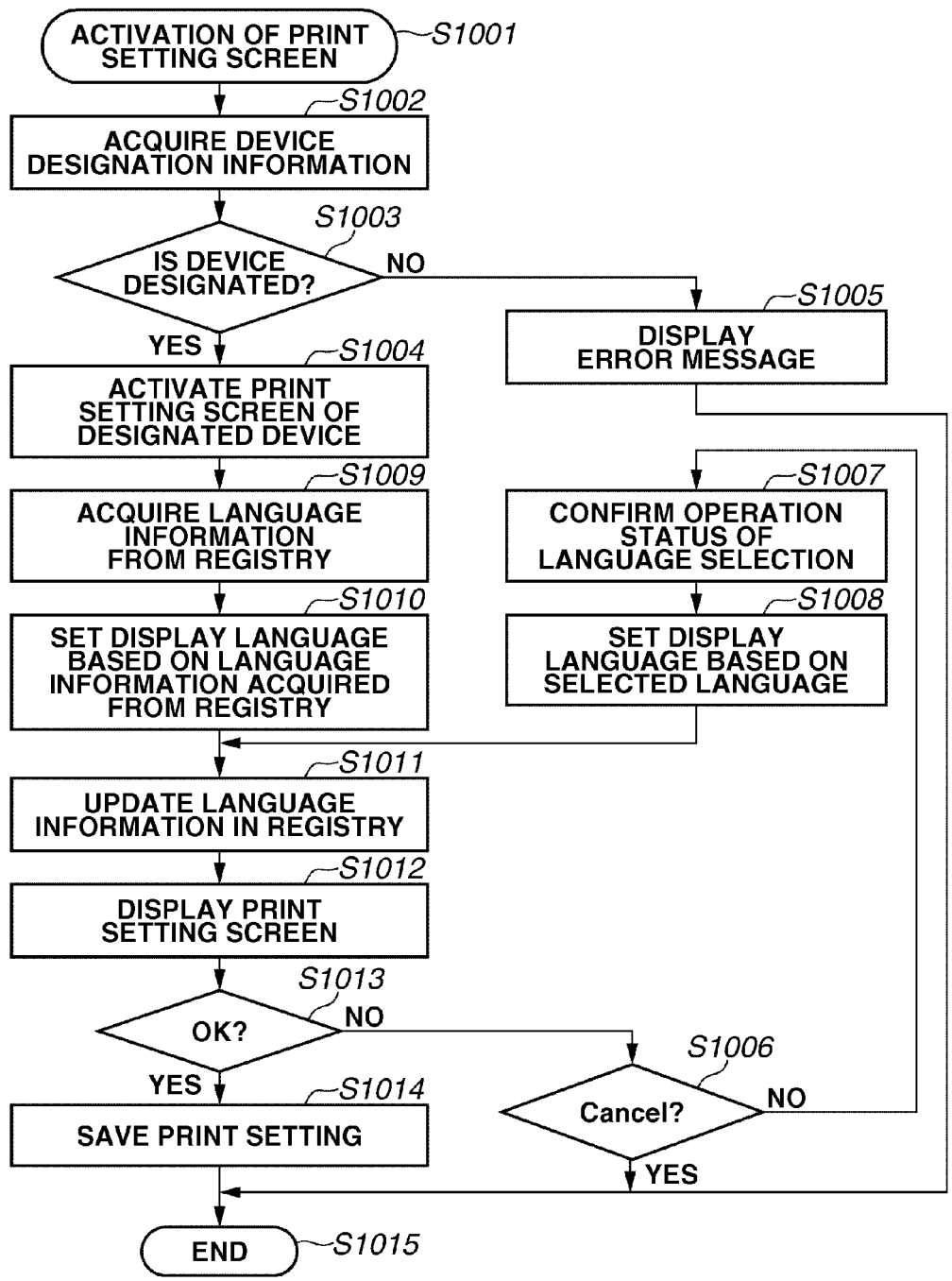
FIG. 15 is a flowchart illustrating an example of a process for activating the print setting screen.

FIG. 15 is a flowchart illustrating an example of a process for activating the print setting screen. The program according to the flowchart illustrated in FIG. 15 is stored in the HDD 202, read by the RAM 201, and executed by the CPU 204 in the PC illustrated in FIG. 2A. A case where the user has changed the language using the language selection box 634 in the print setting screen 142 illustrated in FIGS. 6A and 6B will be described with reference to FIG. 15.

In step S1001, the process for activating the print setting screen 142 is started when the user presses the print setting button 607 in the device management screen 600. The device management control unit 902 in the device management application 80 illustrated in FIG. 10 transmits to the OS via the link execution unit 903 the information described in the <dm: execute> element 810 or 817 illustrated in FIG. 8. In step S1002, the OS then acquires the information that designates the device (MFP 3) indicated by the argument "ABC Kmmn".

In step S1003, the OS determines whether there is information that designates the device of the argument (i.e., device designation information). If there is designation of the device (device designation information) (YES in step S1003), the process proceeds to step S1004. If there is no designation of the device (device designation information) (NO in step S1003), the process proceeds to step S1005. According to the present exemplary embodiment, the device is designated by the information that designates the device of the argument described in the <dm: execute> element 810 or 817 illustrated in FIG. 8. The process thus proceeds from step S1003 to step S1004. For example, if the print setting screen 142 is activated without setting the argument, the process proceeds from step S1003 to step S1005.

In step S1004, the OS loads the UI module of the printer driver for the designated device and activates the print setting screen of the device. The process then proceeds to step S1009. According to the present exemplary embodiment, the OS loads the UI module 35 in the printer driver 50 illustrated in FIG. 4, and activates the print setting screen of the MFP 3.

In step S1005, the OS displays an error message, i.e., "print setting screen cannot be opened". In step S1015, the OS ends the process for activating the print setting screen.

In step S1009, the UI module 35 acquires from the registry described below the language information of the print setting screen 142 which is set as the data in the registry.
HKEY_LOCAL_MACHINE¥SOFTWARE¥ABC¥ Printer Driver¥
Name: Language
Type: REG_SZ In step S1010, the UI module 35 sets the display language of the print setting screen 142 based on the language information in the registry. In step S1011, the UI module 35 then updates the language information in the registry by setting to the value (Data) of the language information in the registry the value indicating the display language of the print setting screen 142. In step S1012, the UI module displays the print setting screen 142.

In step S1013, the UI module 35 confirms whether there is a message indicating that the user has pressed the OK button 635 in the print setting screen 142. If the user has pressed the OK button 635 (YES in step S1013), the process proceeds to step S1014. If the user has not pressed the OK button 635 (NO in step S1013), the process proceeds to step S1006. In step S1014, the UI module 35 saves each of the selected print settings. In step S1015, the UI module 35 closes the print setting screen 142 and ends the process for activating the print setting screen.

On the other hand, in step S1006, the UI module 35 confirms whether there is a message indicating that the user has pressed the cancel button 636 in the print setting screen 142. If the user has pressed the cancel button 636 (YES in step S1006), the process proceeds to step S1015 in which the UI module 35 closes the print setting screen 142 and ends the process for activating the print setting screen. If the user has not pressed the cancel button 636 (NO in step S1006), the process proceeds to step S1007. In step S1007, the UI module 35 confirms the operation status of the language selection box 634. In step S1008, the UI module 142 sets the display language of the print setting screen 142 according to the selected language. The process then proceeds to step S1011.

As described above, the UI module 35 displays the print setting screen 142 based on the language selected by the user using the language selection box 634. The UI module 35 then sets to the registry described below the value indicating the display language of the print setting screen 142.
HKEY_LOCAL_MACHINE¥SOFTWARE¥ABC¥ Printer Driver¥
Name: Language
Type: REG_SZ FIG. 16 is a flowchart illustrating an example of the process for activating the photo print application. The program according to the flowchart illustrated in FIG. 16 is stored in the HDD 202, read by the RAM 201, and executed by the CPU 204 in the PC illustrated in FIG. 2A. A case where the user has changed the language using the language selection box 622 in the main screen of the photo print application 143 illustrated in FIGS. 7A and 7B will be described with reference to FIG. 16.

In step S1101, when the user presses the photo print button 611 on the device management screen 600, the process for activating the photo print application 143 is started. The device management control unit 902 in the device management application 80 illustrated in FIG. 10 transmits to the application control unit 907 via the link execution unit 903 the information described in the <dm: execute> element 825, 833, 841, or 849 illustrated in FIGS. 8 and 9. In step S1102, the application control unit 907 then acquires the information that designates the device (MFP 3) indicated by the argument "ABC Kmmn".

In step S1103, the application control unit 907 determines whether there is information that designates the device of the argument (i.e., device designation information). If there is designation of the device (device designation information) (YES in step S1103), the process proceeds to step S1104. If there is no designation of the device (device designation information) (NO in step S1103), the process proceeds to step S1105. According to the present exemplary embodiment, the device is designated by the information that designates the device of the argument described in the <dm: execute> element 825, 833, 841, or 849 illustrated in FIGS. 8 and 9. The process thus proceeds from step S1103 to step S1104. For example, if the photo print application 143 is activated without setting the argument, the process proceeds from step S1103 to step S1105.

In step S1104, the default device setting unit 908 sets the designated device as a default device of the photo print application 143. The process then proceeds to step S1109.

In step S1105, the default device setting unit 908 acquires default device information of the OS via the API/DDI 84. The default device of the OS is the device to which the default mark 502 is attached in the folder 500 illustrated in FIG. 5A. According to the present exemplary embodiment, the device 501 (XYZ Defg) is set as the default device. In step S1105, the default device setting unit 908 thus acquires the device name "XYZ Defg". In step S1106, the default device setting unit 908 sets the device (driver) name to the default device of the photo print application 143 based on the default device of the OS acquired in step S1105. The process then proceeds to step S1109.

In step S1106, if the default device setting unit 908 cannot find the appropriate device (driver) name from the default devices of the OS acquired in step S1105, the default device setting unit 908 sets the device (driver) name set when the photo print application is previously activated as the default device. The default device information of the photo print application 143 is stored in the memory on the RAM 201 managed by the photo print application 143.

In step S1109, the application control unit 907 acquires form the registry described below the language information of the main screen of the photo print application 143 set as the value (data) in the registry.
HKEY_LOCAL_MACHINE¥SOFTWARE¥ABC¥ Photo Print¥
Name: Language
Type: REG_SZ In step S1110, the application control unit 907 sets the display language of the main screen of the photo print application 143 based on the language information in the registry. In step S1111, the application control unit 907 then updates the language information in the registry by setting to the value (Data) of the language information in the registry the value indicating the display language of the main screen of the photo print application 143. In step S1112, the application control unit 907 displays the main screen of the photo print application 143.

In step S1113, the application control unit 907 confirms whether there is a message indicating that the user has pressed the end button 629 in the main screen of the photo print application 143. If the user has pressed the end button 629 (YES in step S1113), the process proceeds to step S1114. In step S1114, the application control unit 907 closes the main screen and ends the process for activating the photo print application. If the user has not pressed the end button 529 (NO in step S1113), the process proceeds to step S1107. In step S1107, the application control unit 907 confirms the operation status of the language selection box 622. In step S1108, the application control unit 907 sets the display language of the main screen according to the selected language. The process then proceeds to step S1111.

As described above, the application control unit 907 displays the main screen of the photo print application 143 based on the language selected by the user using the language selection box 622. The application control unit 907 then sets to the registry described below the value indicating the display language of the main screen.
HKEY_LOCAL_MACHINE¥SOFTWARE¥ABC¥ Photo Print¥
Name: Language
Type: REG_SZ FIGS. 17A, 17B, and 17C illustrate examples of the device management screen 600. FIG. 17A illustrates an example of a case in which the print setting button 607 of ID 1 and the photo print button 611 of ID 4 are displayed. FIG. 17B illustrates an example of a case in which the print setting button 607 of ID 2 and the photo print button 611 of ID 5 are displayed. FIG. 17C illustrates an example of a case in which the print setting button 607 of ID 2 and the photo print button 611 of ID 6 are displayed.

The present invention can also be achieved by providing via a network or a storage medium, software (program code) for implementing functions of the above-described exemplary embodiments to an apparatus. The software (program code) can be read and executed by a computer (a central processing unit (CPU) or a micro-processing unit (MPU)) of the system or the apparatus. For example, a computer-readable medium or a computer-readable storage medium may have a program stored thereon that causes an information processing apparatus to perform a method described herein. Further, according to the above-described exemplary embodiment, the device management application 80 illustrated in FIG. 10 is an example of the application. However, the present invention is not limited to such an example and may be effectively implemented by any application including similar functions.

Furthermore, according to the above-described exemplary embodiment, the display language of the print setting screen 142 or the main screen of the photo print application 143 is used. However, the present invention is not limited to such an example, and may be effectively implemented by describing information about a destination or the display language of the device (MFP 3) and controlling the display and the function of each button in the device management screen 600 based on such information.

Moreover, according to the above-described exemplary embodiment, the user-friendliness is improved when the display language of the print setting screen 142 and the display language of the main screen of the photo print application 143 are different. This is realized by devising the description added to each button and displaying of the icons in the device management screen 600. However, the present invention is not limited to such an example and may be effectively implemented by devising the display of a tool tip for each button in the device management screen 600. Further, according to the above-described exemplary embodiment, the photo print application 143 illustrated in FIG. 7 is described as an example of the application. However, the present invention is not limited to such an example and may be effectively implemented by any application having similar functions, such as an application for reading an image or a document.

Furthermore, according to the above-described exemplary embodiment, the PC is described as an example of the information processing apparatus. However, the present invention is not limited to such an example and may be effectively implemented by any information processing apparatus that may be similarly used, such as a digital versatile disc (DVD) player, a game console, a set top box, or an Internet appliance.

Moreover, according to the above-described exemplary embodiment, the OS equivalent to Windows® 7 is used as the OS. However, the present invention is not limited to such an OS, and any OS may be used.

Further, according to the above-described exemplary embodiment, the Ethernet is used as an example of the network 4. However, the present invention is not limited to such an example and may use any other network configuration. The same applies to the interface between the PC 1 and the MFP 3, and between the PC 1 and the MFP 7. For example, any interface may be used, such as a wireless LAN, Institute of Electrical and Electronics Engineers (IEEE) 1394, Bluetooth, and USB. Furthermore, according to the above-described exemplary embodiment, WSD is used as an example of the Web service protocol. However, the present invention is not limited to such an example, and any protocol may be used, such as a unique protocol of the IHV.

Moreover, according to the above-described exemplary embodiment, when the user presses the photo print button 611 in the device management screen 600, the photo print application 143 is activated while an appropriate device (driver) is set. However, the present invention is not limited to such an example. The user may designate an appropriate device (driver) name when activating an application, linking to a web site, or providing a service from the device management screen.

As described above, according to the exemplary embodiment of the present invention, the device management screen that provides an appropriate display or function according to the usage environment of the user can be realized.

Further, according to the exemplary embodiment of the present invention, when the application is activated to control the peripheral device, the peripheral device can be appropriately and firmly controlled by automatically matching the usage environment of the user, and in particular the display language. As a result, the appropriate display or function according to the usage environment of the user can be provided.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-262073 filed Nov. 17, 2009, which is hereby incorporated by reference herein in its entirety.

What is claimed is:

1. An information processing apparatus configured to display a management screen, which is provided by an operating system and is used for managing a connected peripheral device, the operating system providing a first type of language for the management screen, wherein the displaying of the management screen is based on control information described with respect to functions that are provided by a device driver for the peripheral device and a specific application providing a process for the peripheral device and can be instructed from the management screen, the information processing apparatus comprising:
   a processor; and
   a registration unit configured to register in a registry a second type of language displayed on a screen provided by the specific application that runs on the processor,
   wherein the registration unit, as the specific application, is configured to register in the registry the second type of language when the specific application is activated,
   wherein the management screen includes a first portion for instructing to activate a setting screen of the device driver and a second portion for instructing to activate the specific application, and
   wherein, if a condition indicates that the first type of language provided for the management screen is different than the second type of language registered in the registry, a display including a message about the second type of language used by the specific application is performed on the second portion of the management screen based on the control information in which the message is described in association with the condition.

2. The information processing apparatus according to claim 1, wherein a display language and a display content of the specific application in the second portion are determined based on the control information and the second type of language registered by the registration unit, and the determined display content is displayed in the determined display language.

3. The information processing apparatus according to claim 1, wherein the management screen is provided for each of a plurality of peripheral devices in a case where the information processing apparatus is connected to the plurality of peripheral devices.

4. The information processing apparatus according to claim 1, wherein, in a case where the first type of language provided for the management screen is different than the second type of language registered in the registry, the message about the second type of language is displayed using the first type of language.

5. An information processing method for an information processing apparatus configured to display a management screen, which is provided by an operating system and is used for managing a connected peripheral device, the operating system providing a first type of language for the management screen, wherein the displaying of the management screen is based on control information described with respect to functions that are provided by a device driver for the peripheral device and a specific application providing a process for the peripheral device and can be instructed from the management screen, and including a storing unit including a registry, wherein the management screen includes a first portion for instructing to activate a setting screen of the device driver and a second portion for instructing to activate the specific application, the information processing method comprising:
   registering in the registry a second type of language displayed on a screen provided by the specific application that runs on the information processing apparatus, wherein the second type of language is registered in the registry when the specific application is activated; and
   if a condition indicates that the first type of language provided for the management screen is different than the second type of language registered in the registry, performing a display including a message about the second type of language used by the specific application on the second portion of the management screen based on the control information in which the message is described in association with the condition.

6. A non-transitory computer-readable storage medium storing a computer program that causes a computer to execute a method for an information processing apparatus configured to display a management screen, which is provided by an operating system and is used for managing a connected peripheral device, the operating system providing a first type of language for the management screen, wherein the displaying of the management screen is based on control information described with respect to functions that are provided by a device driver for the peripheral device and a specific application providing a process for the peripheral device and can be instructed from the management screen, and including a storing unit including a registry, wherein the management screen includes a first portion for instructing to activate a setting screen of the device driver and a second portion for instructing to activate the specific application, the method comprising:
   registering in the registry a second type of language displayed on a screen provided by the specific application that runs on the information processing apparatus, wherein the second type of language is registered in the registry when the specific application is activated; and
   if a condition indicates that the first type of language provided for the management screen is different than the second type of language registered in the registry, performing a display including a message about the second type of language used by the specific application on the second portion of the management screen based on the control information in which the message is described in association with the condition.

* * * * *